(12) United States Patent
Lee et al.

(10) Patent No.: US 12,523,917 B2
(45) Date of Patent: Jan. 13, 2026

(54) CAMERA ACTUATOR

(71) Applicant: LG INNOTEK CO., LTD., Seoul (KR)

(72) Inventors: Mi Sun Lee, Seoul (KR); Kyung Won Kim, Seoul (KR); Kyung Sung Chu, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 326 days.

(21) Appl. No.: 18/022,310

(22) PCT Filed: Aug. 20, 2021

(86) PCT No.: PCT/KR2021/011108
§ 371 (c)(1),
(2) Date: Feb. 21, 2023

(87) PCT Pub. No.: WO2022/039548
PCT Pub. Date: Feb. 24, 2022

(65) Prior Publication Data
US 2024/0036436 A1    Feb. 1, 2024

(30) Foreign Application Priority Data

Aug. 20, 2020  (KR) .................. 10-2020-0104707

(51) Int. Cl.
*G03B 3/10*     (2021.01)
*G03B 5/00*     (2021.01)
(Continued)

(52) U.S. Cl.
CPC .............. *G03B 3/10* (2013.01); *G03B 5/00* (2013.01); *G03B 17/12* (2013.01); *H04N 23/60* (2023.01);
(Continued)

(58) Field of Classification Search
CPC ......... G02F 1/133524; G02F 1/133607; G02F 1/1323; G02B 7/09; G02B 7/005;
(Continued)

(56) References Cited

U.S. PATENT DOCUMENTS

2010/0060966 A1   3/2010   Cheong et al.
2017/0150055 A1   5/2017   Chung et al.
(Continued)

FOREIGN PATENT DOCUMENTS

JP    2011-158551    8/2011
KR    10-2010-0030393    3/2010
(Continued)

OTHER PUBLICATIONS

International Search Report dated Dec. 10, 2021 issued in Application No. PCT/KR2021/011108.
(Continued)

*Primary Examiner* — Marin Pichler
(74) *Attorney, Agent, or Firm* — KED & ASSOCIATES

(57) ABSTRACT

A camera actuator according to an embodiment includes a housing; a prism part disposed in the housing; and a driving part disposed in the housing and tilting the prism part; wherein the driving part includes: a first piezoelectric element disposed in a region overlapping in a first direction with respect to a center of the prism part; and a second piezoelectric element disposed in a region overlapping in a second direction different from the first direction with respect to the center of the prism part, wherein the prism part is provided to be tiltable in the second direction by the first piezoelectric element, and is provided to be tiltable in the first direction by the second piezoelectric element.

20 Claims, 30 Drawing Sheets

(51) Int. Cl.
*G03B 17/12* (2021.01)
*H04N 23/60* (2023.01)

(52) U.S. Cl.
CPC ............. *G03B 2205/0023* (2013.01); *G03B 2205/0046* (2013.01); *G03B 2205/0061* (2013.01)

(58) Field of Classification Search
CPC . G02B 7/04; G02B 7/10; G02B 27/64; G02B 27/646; G02B 13/001; G02B 7/023; G02B 7/08; G03B 5/00; G03B 13/34; G03B 13/36; G03B 13/32; G03B 2205/0069; G03B 2205/0061; G03B 2205/003; G03B 2205/0015; G03B 2205/0007; G03B 2205/0046; G03B 19/22; G03B 3/10; G03B 17/02; H04N 5/2328; H04N 5/2253; H04N 5/2254; H05K 1/18; H02K 41/0354; H02K 41/0356
USPC ........................................................ 359/555
See application file for complete search history.

(56) References Cited

U.S. PATENT DOCUMENTS

| | | | |
|---|---|---|---|
| 2018/0231793 A1* | 8/2018 | Jeong | ................. G03B 5/00 |
| 2018/0356645 A1* | 12/2018 | Jeong | ............... G02B 27/646 |
| 2019/0028647 A1* | 1/2019 | Chung | ................ H04N 23/687 |

FOREIGN PATENT DOCUMENTS

| | | |
|---|---|---|
| KR | 10-1051074 | 7/2011 |
| KR | 10-2011-0126945 | 11/2011 |
| KR | 10-2017-0060413 | 6/2017 |
| KR | 10-2018-0097228 | 8/2018 |
| WO | WO 2015-163571 | 10/2015 |

OTHER PUBLICATIONS

Korean Office Action issued in Application No. KR 10-2020-0104707 dated Sep. 15, 2025.

* cited by examiner

【FIG. 1】
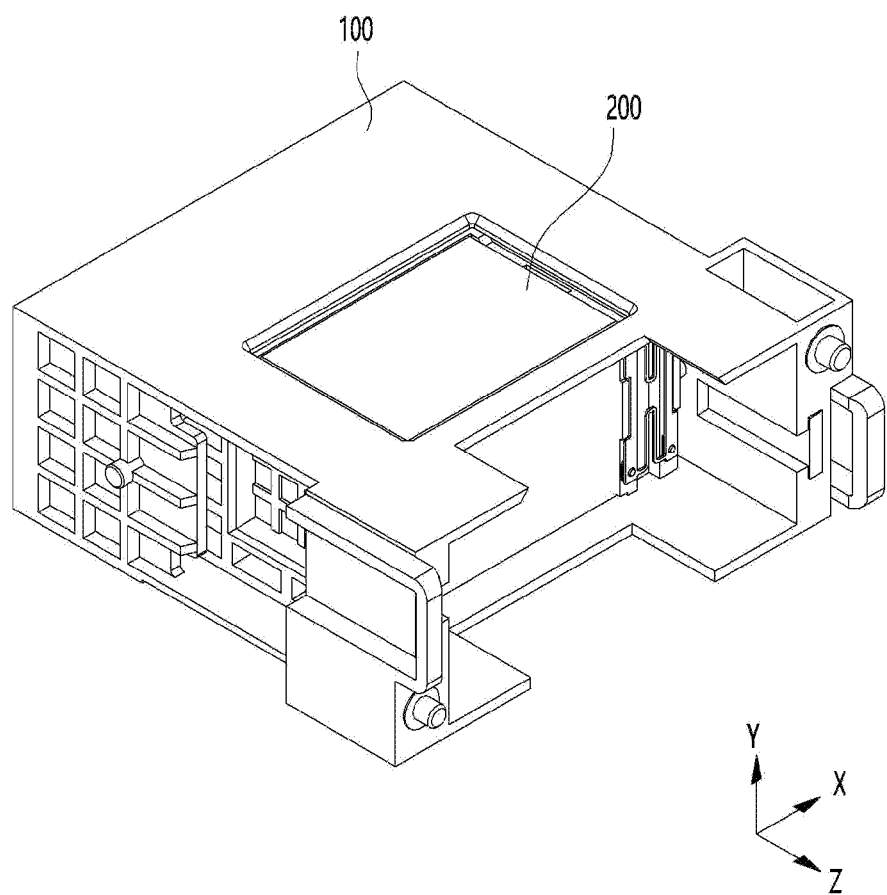

[FIG. 2]
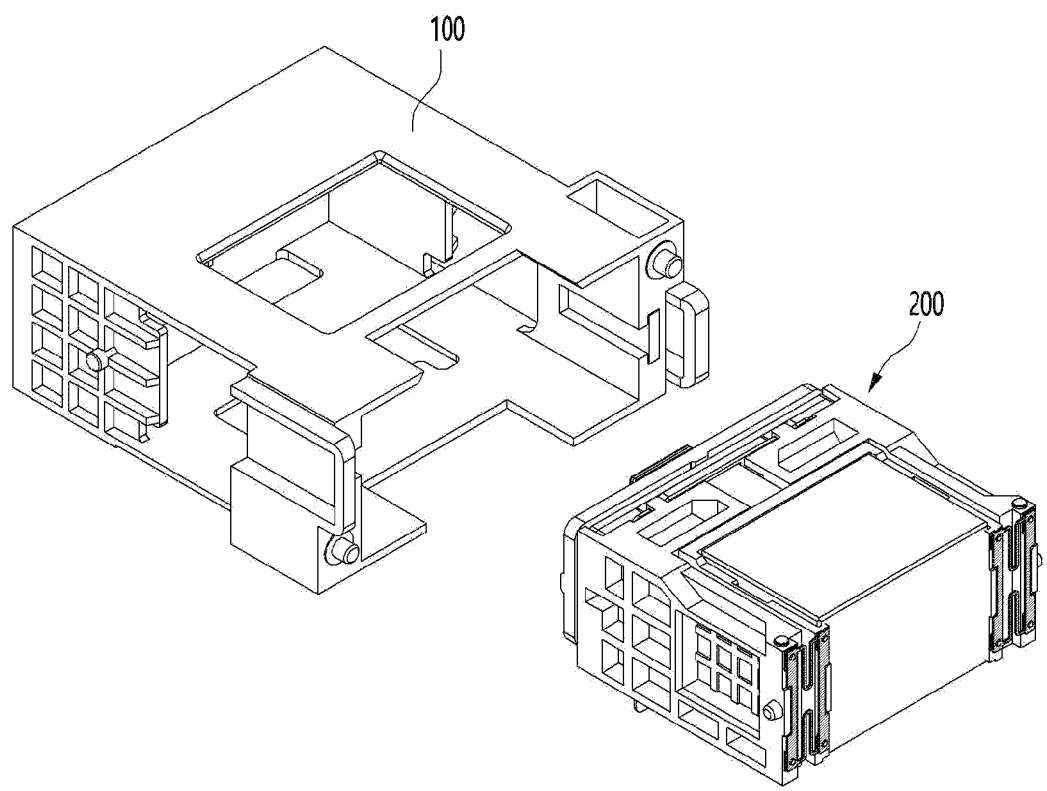

[FIG. 3]
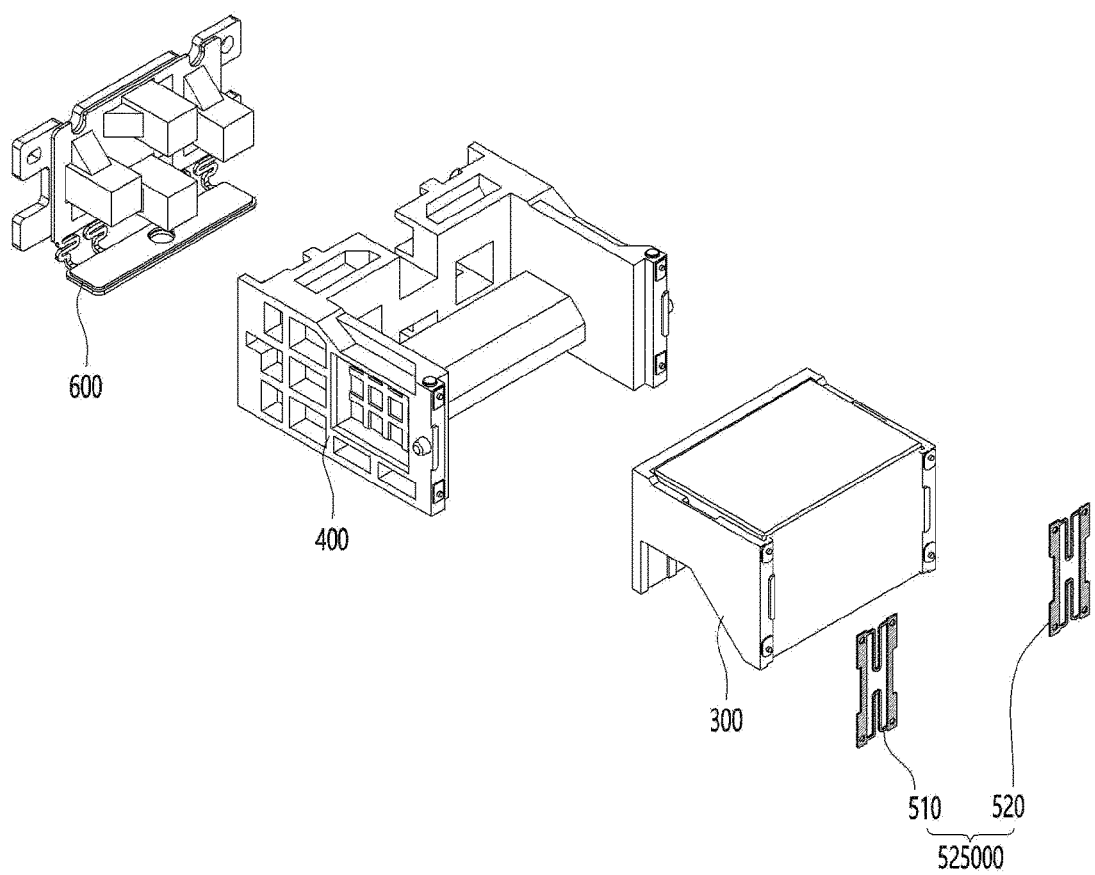

[FIG. 4]
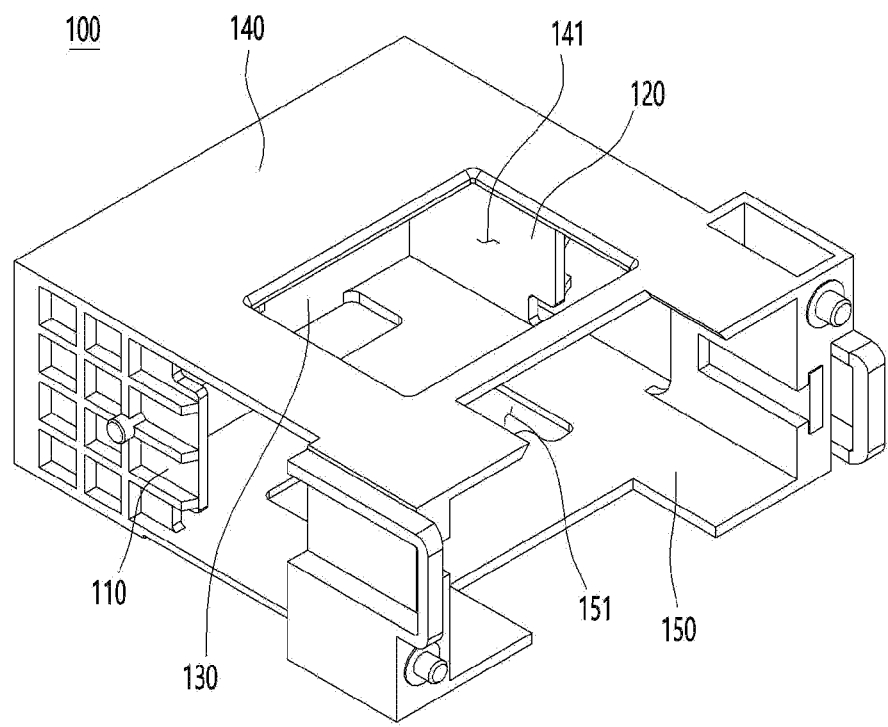

[FIG. 5]
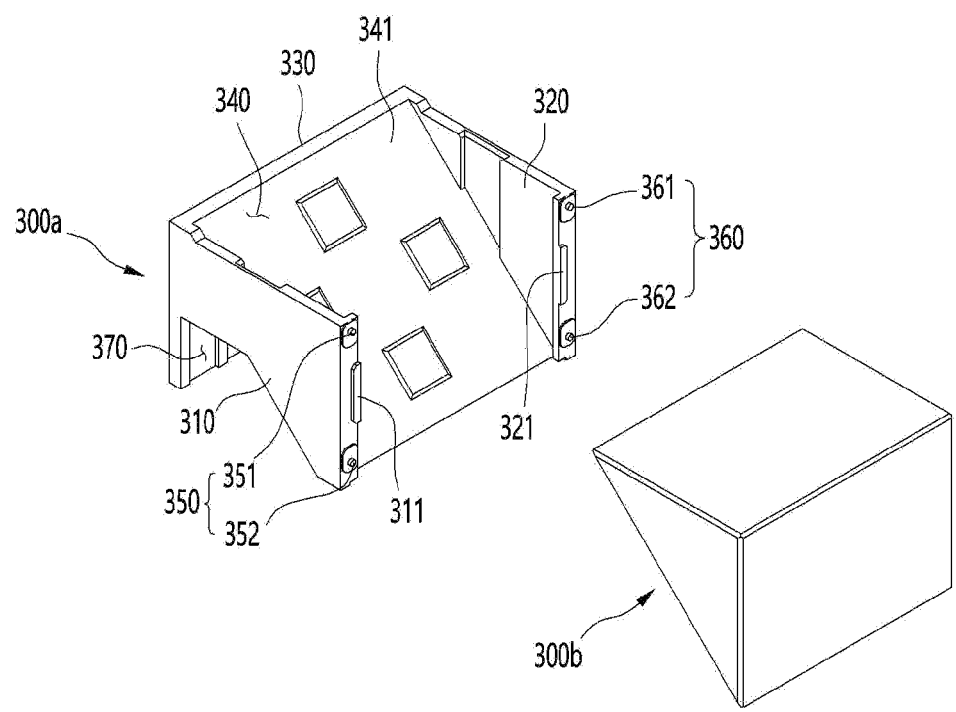

[FIG. 6]
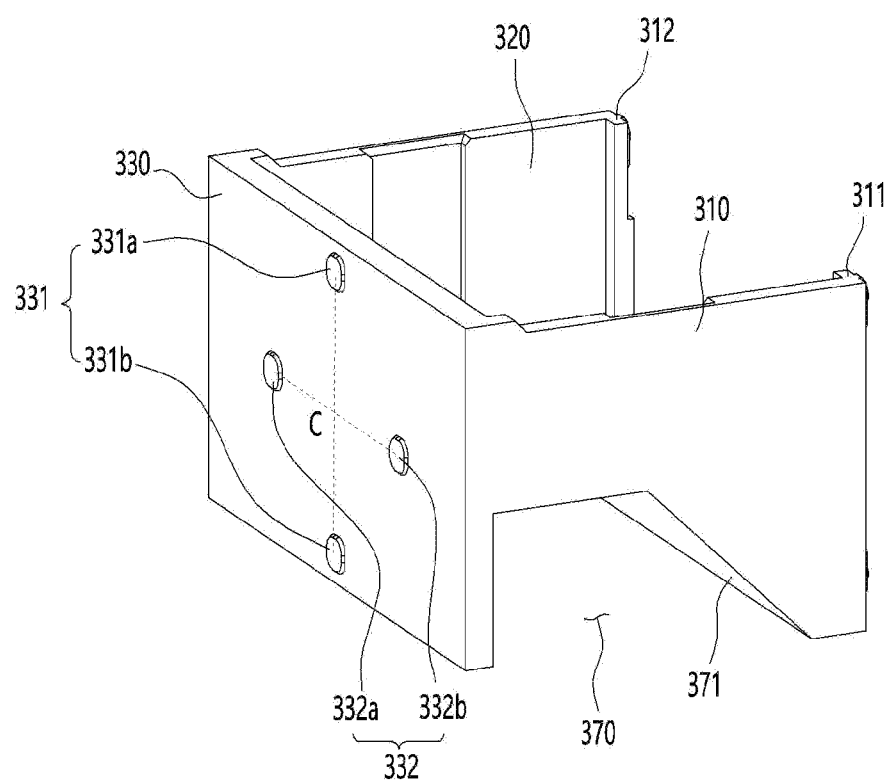

[FIG. 7]
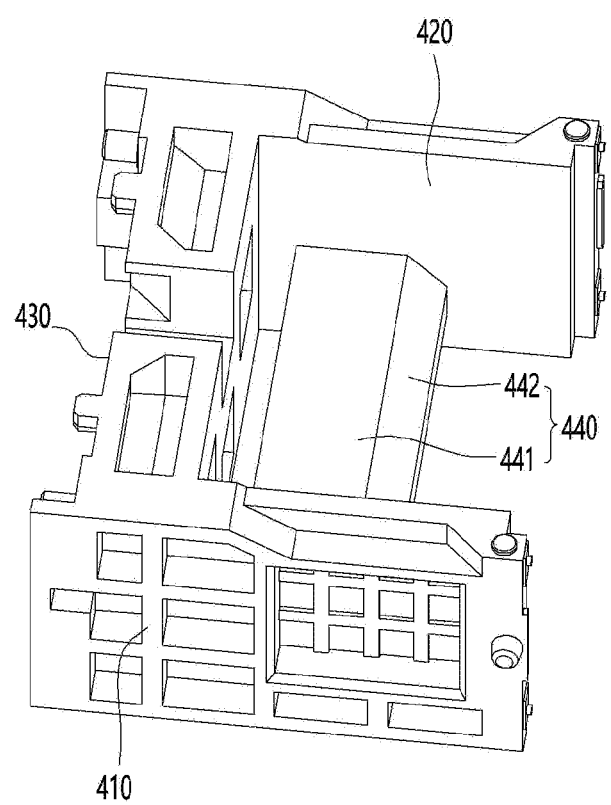

【FIG. 8】
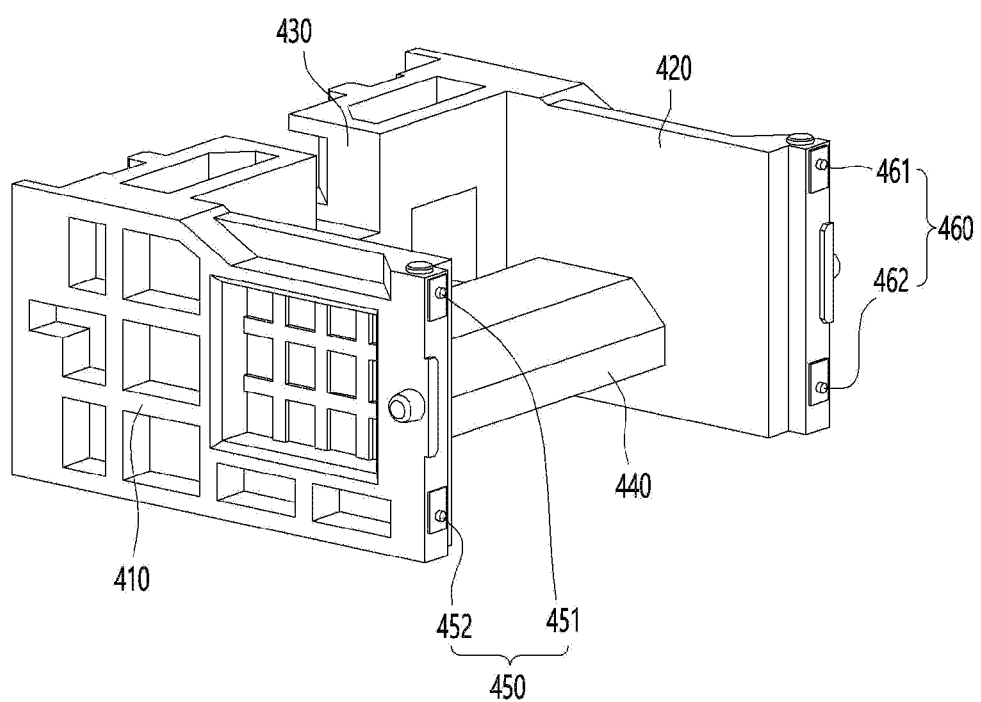

【FIG. 9A】
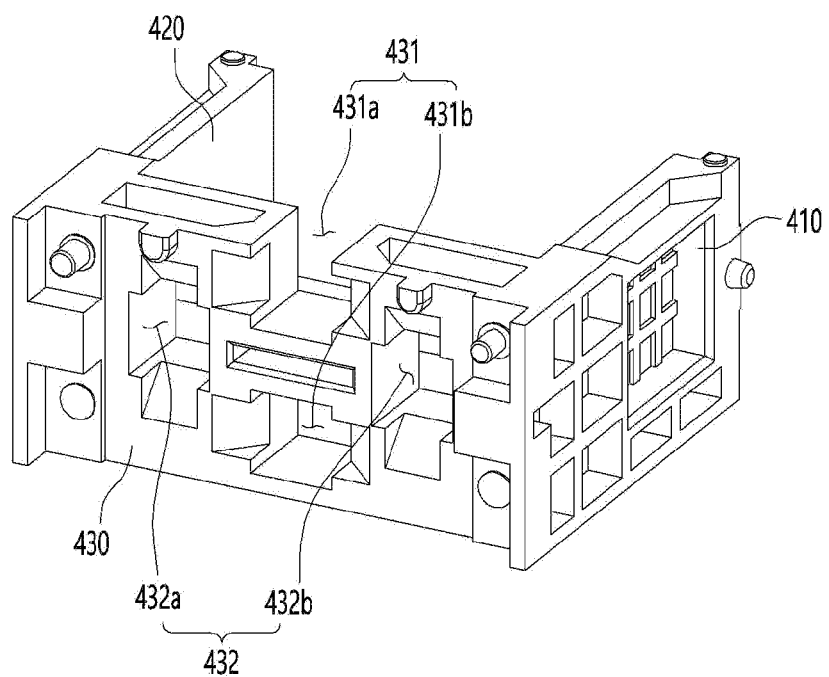

【FIG. 9B】
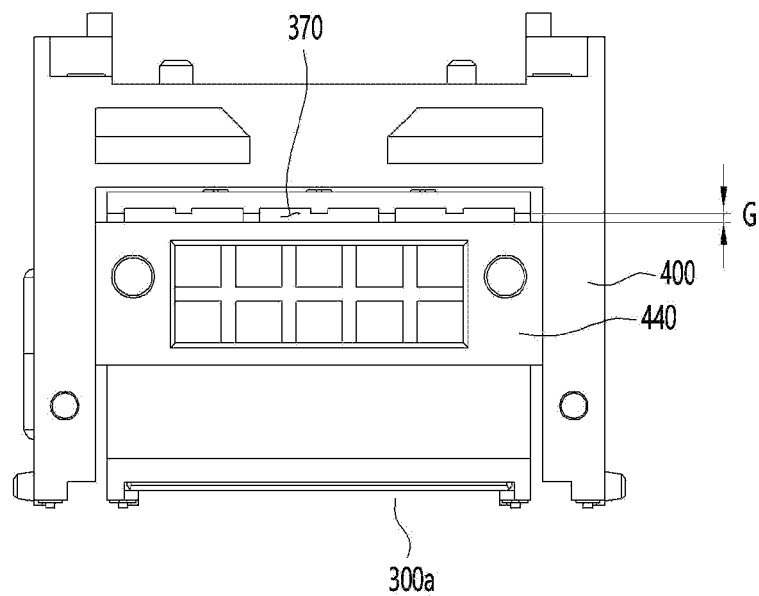

[FIG. 10]
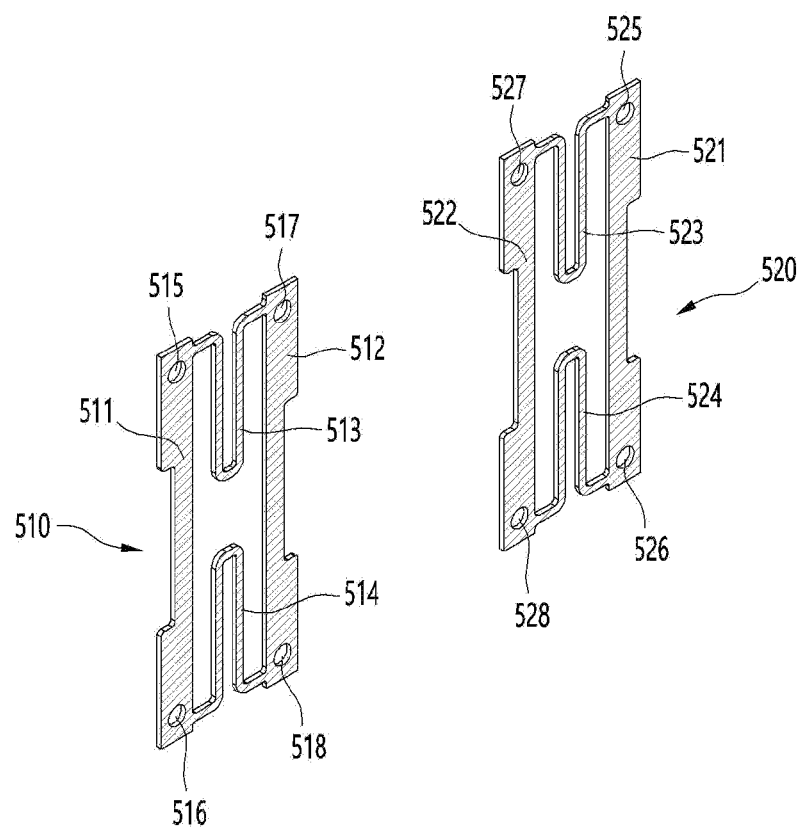

[FIG. 11]
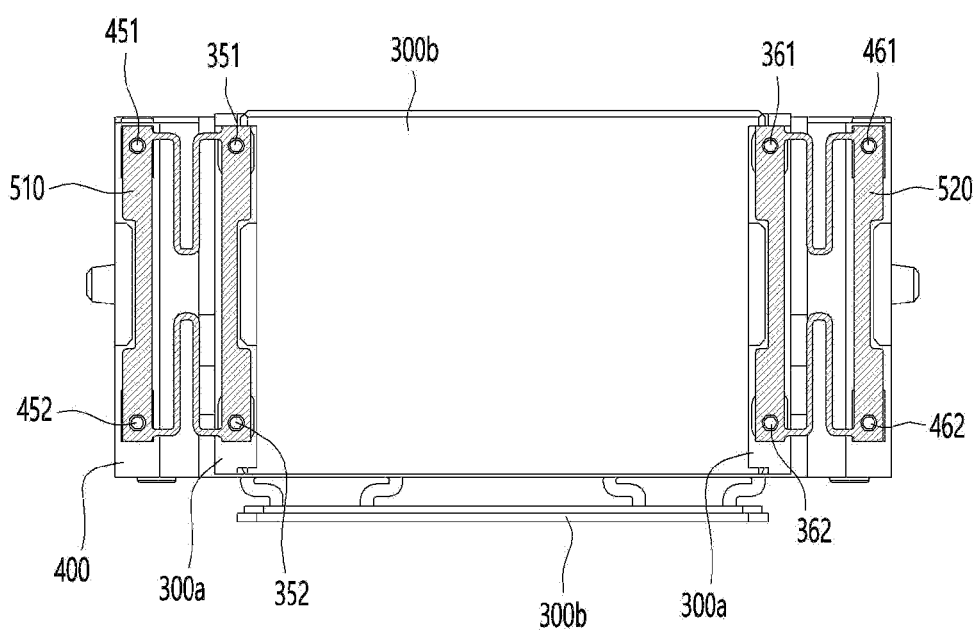

【FIG. 12】
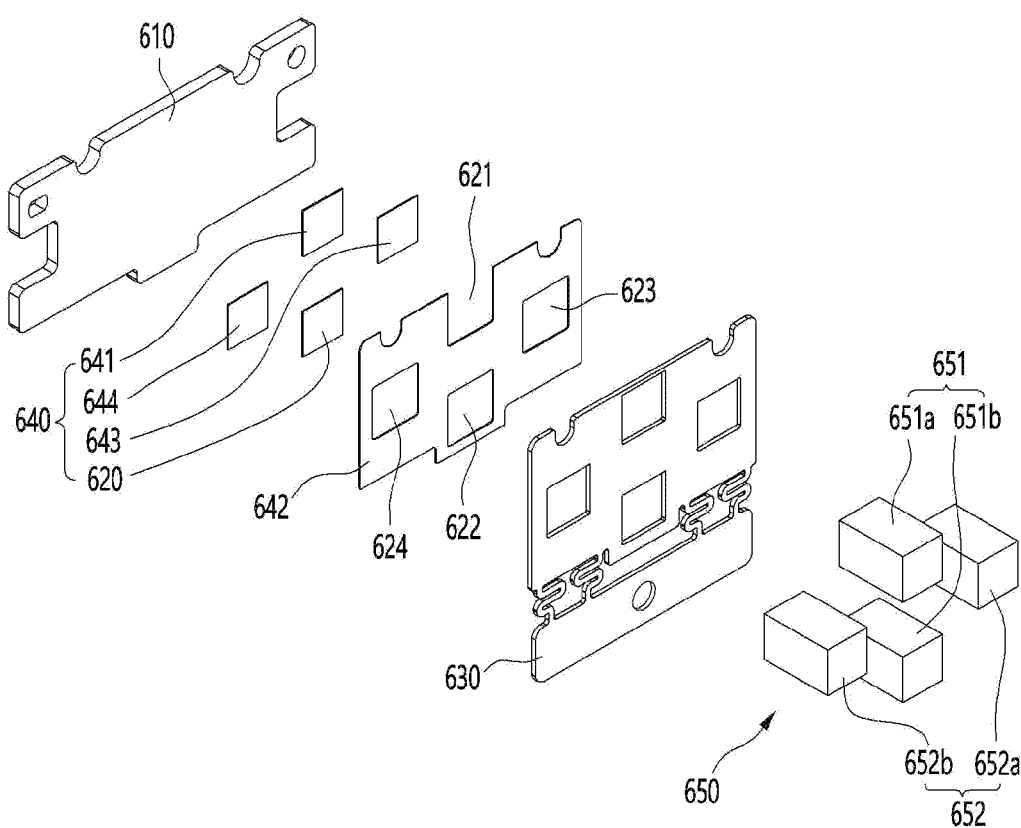

【FIG. 13】
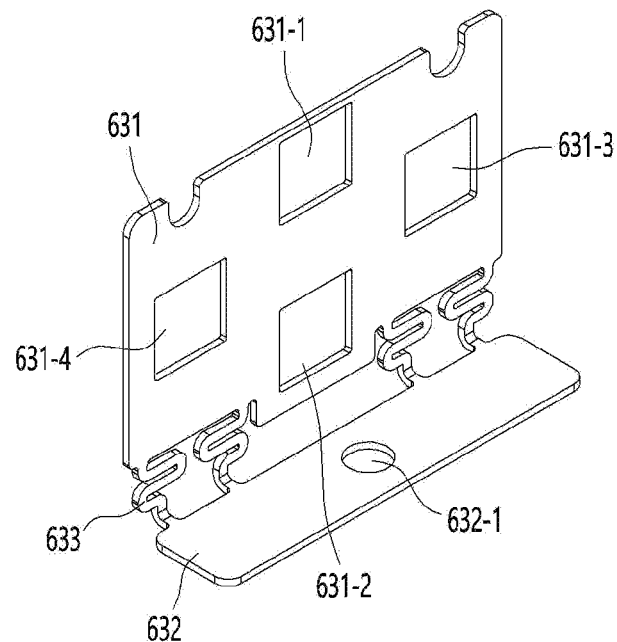
【FIG. 14】
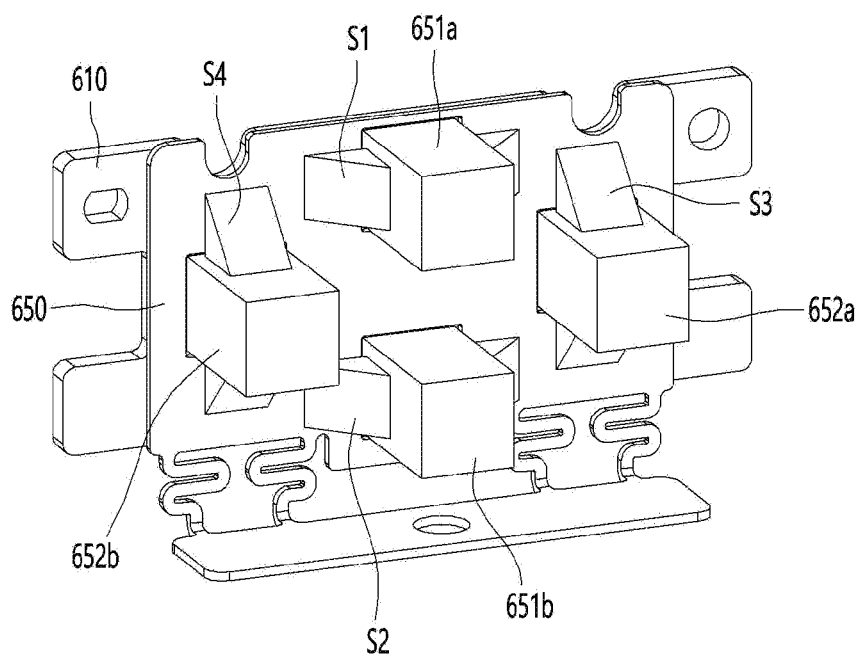

【FIG. 15】
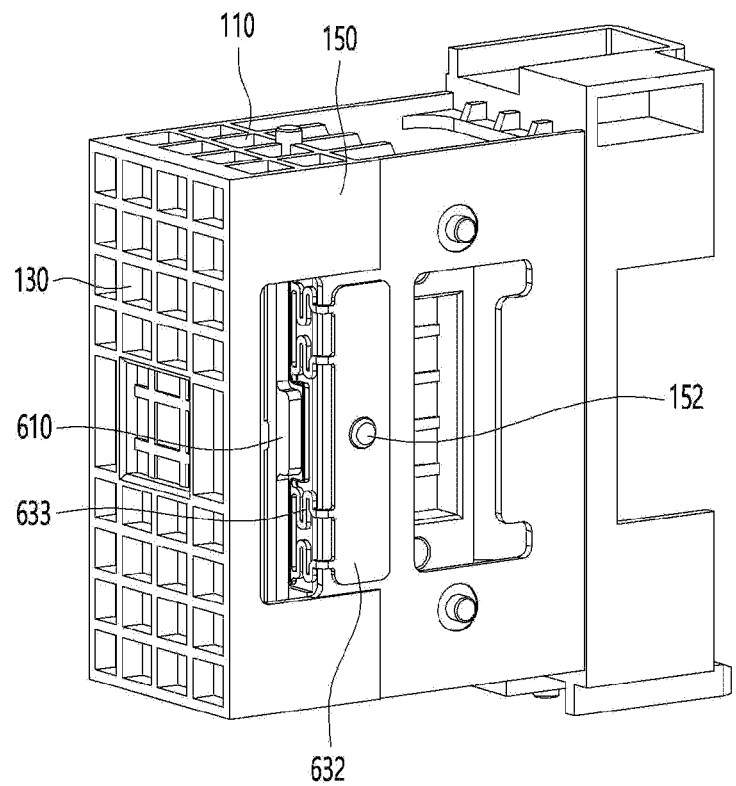
【FIG. 16A】
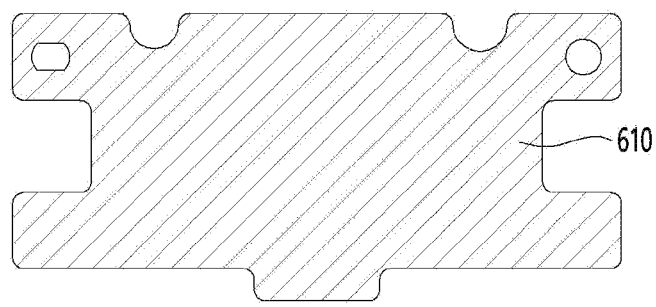

【FIG. 16B】
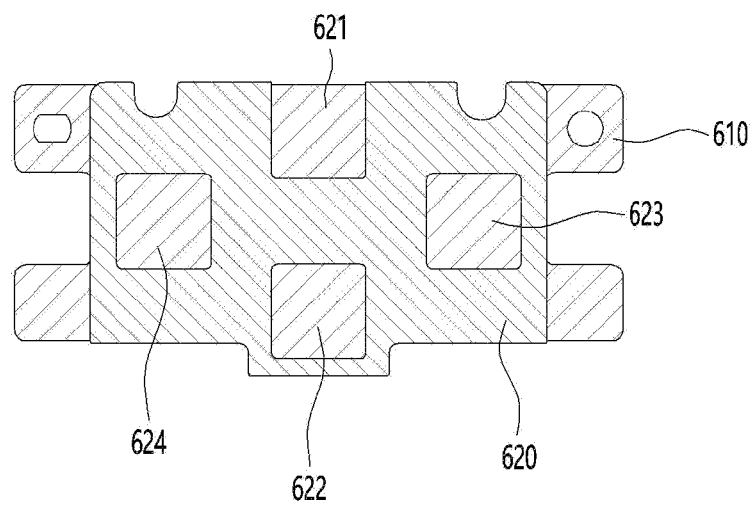
【FIG. 16C】
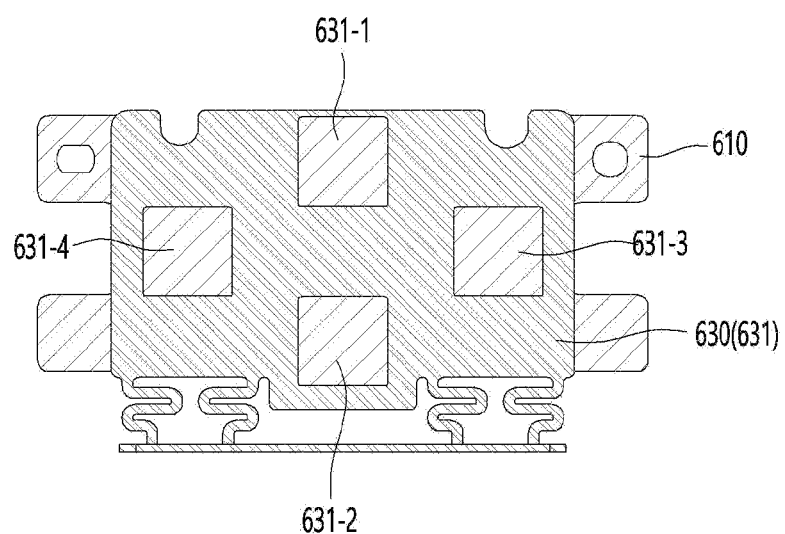

【FIG. 16D】
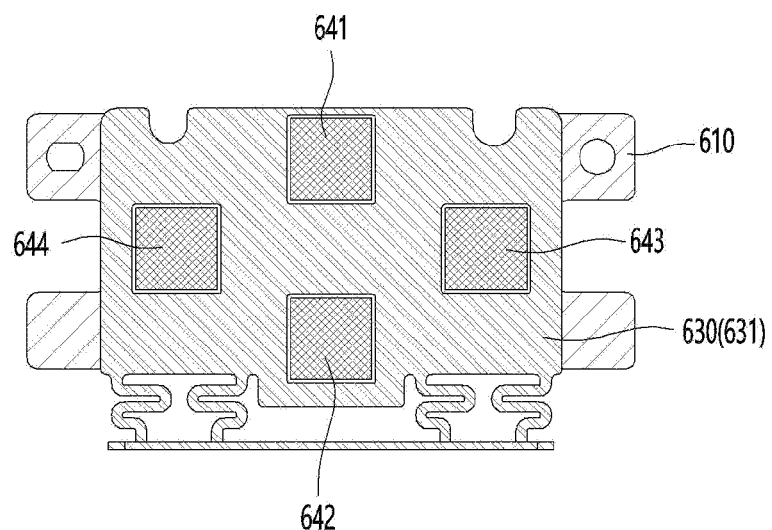
【FIG. 16E】
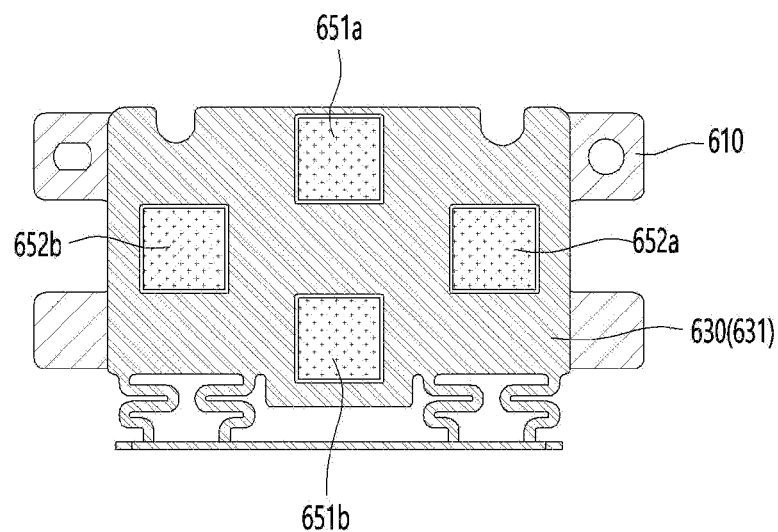

【FIG. 16F】
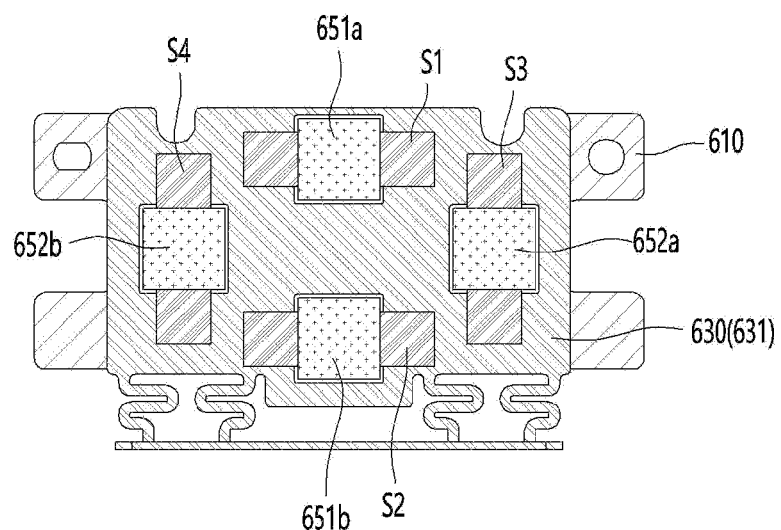
【FIG. 16G】
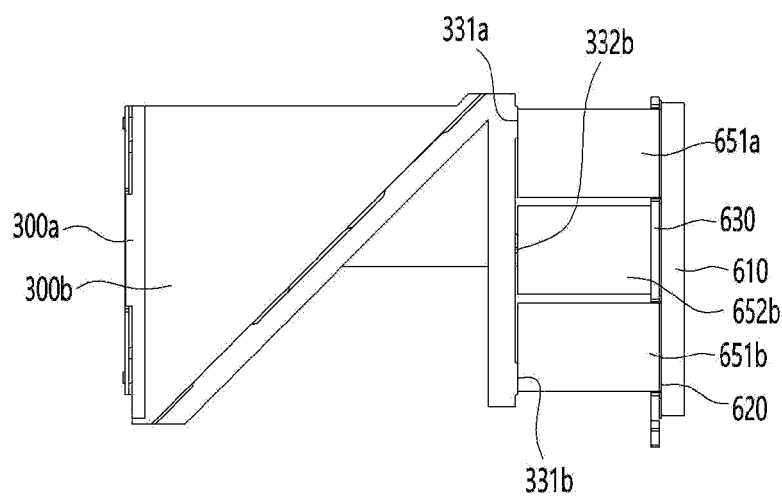

[FIG. 17]
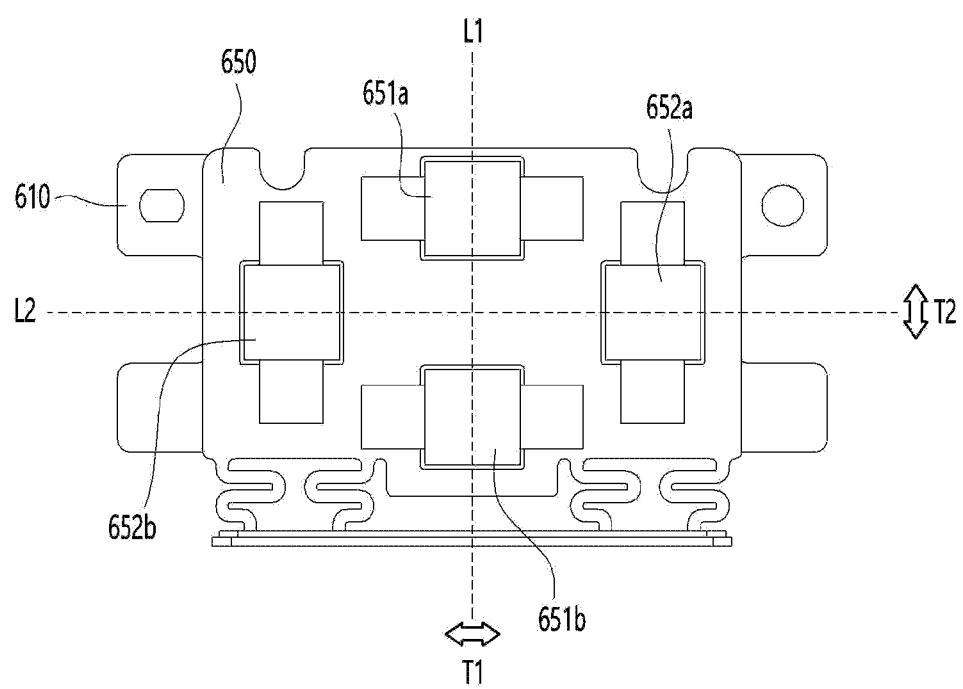

【FIG. 18】
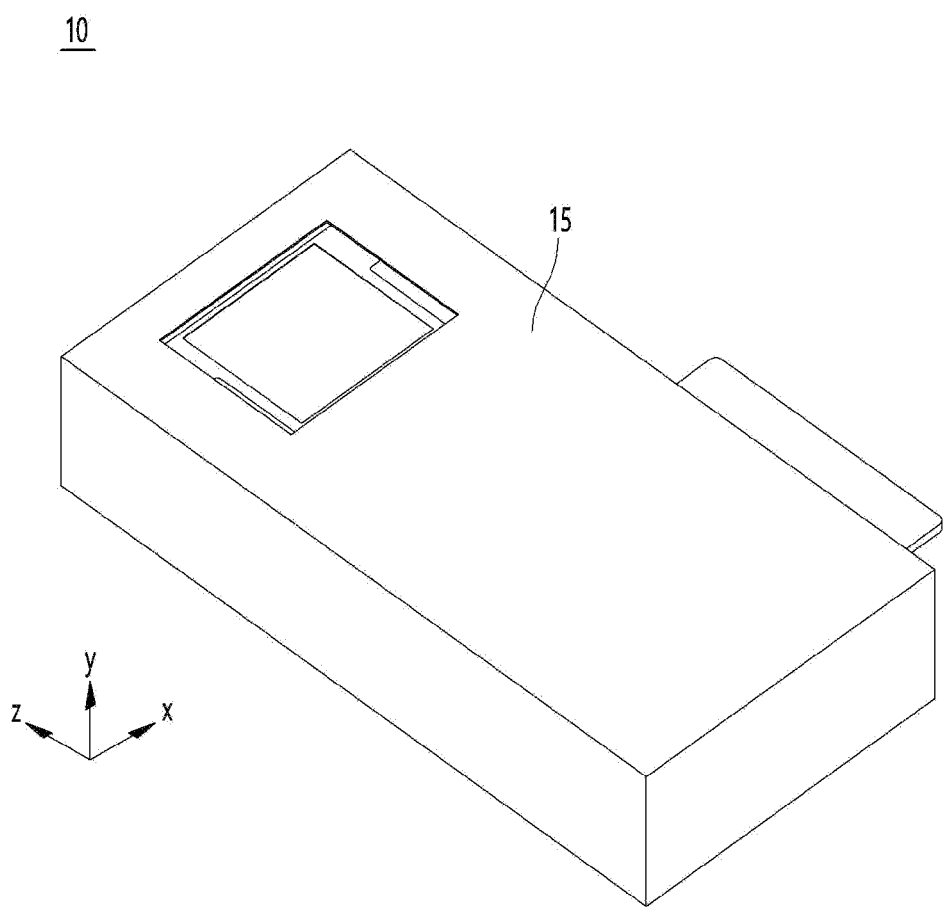

[FIG. 19]
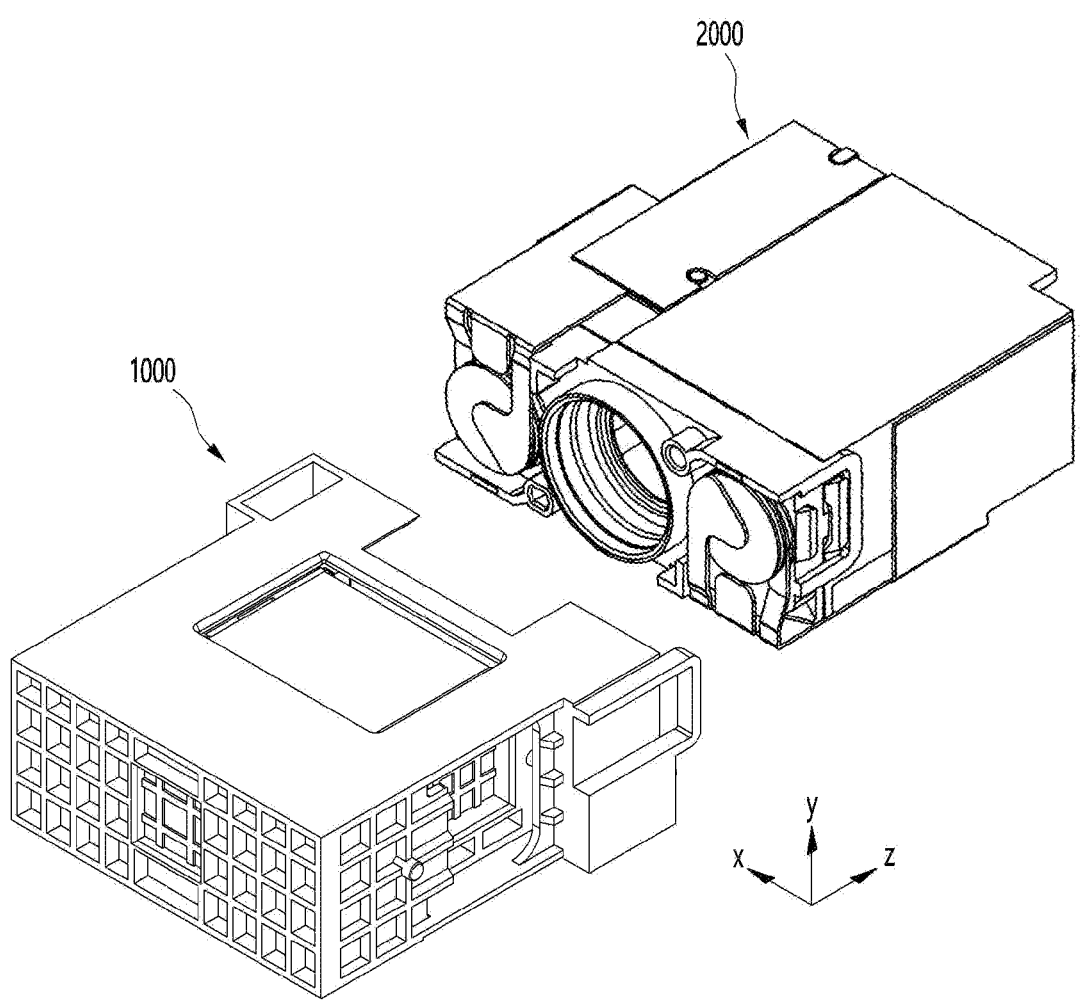

【FIG. 20】
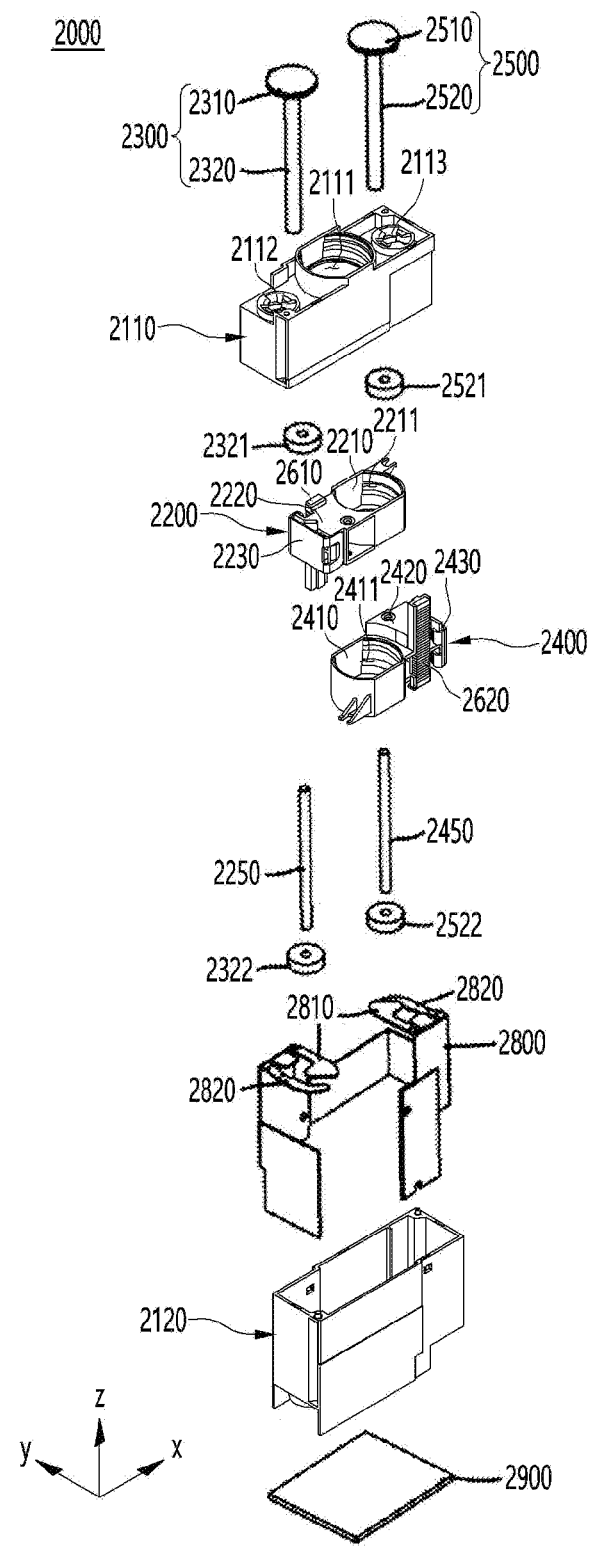

[FIG. 21]
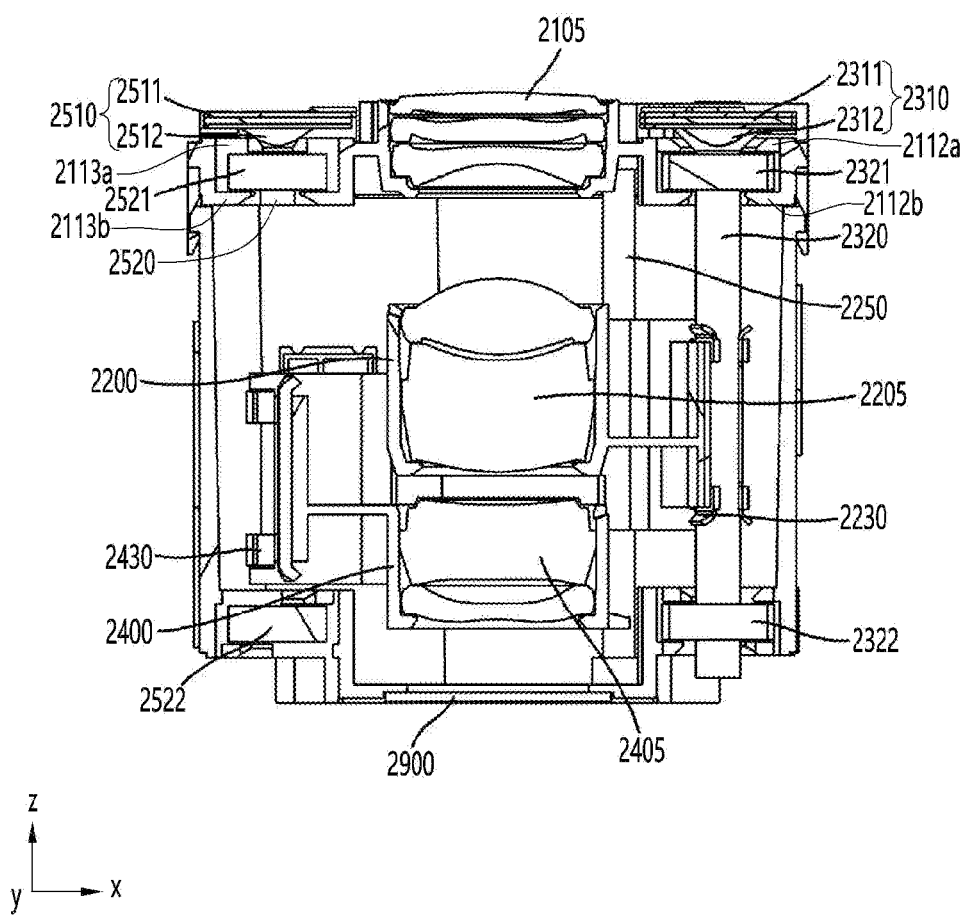

[FIG. 22]
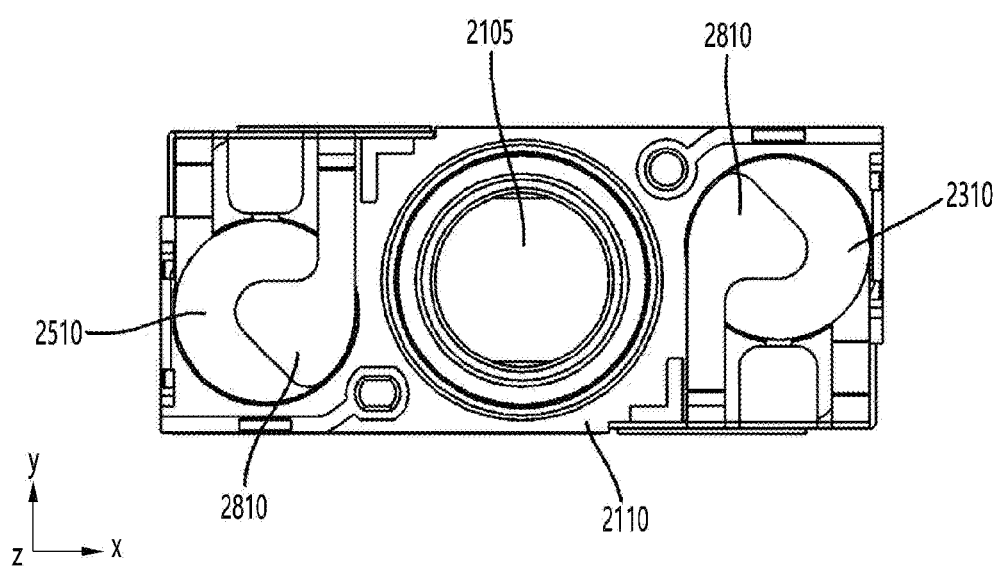

[FIG. 23]
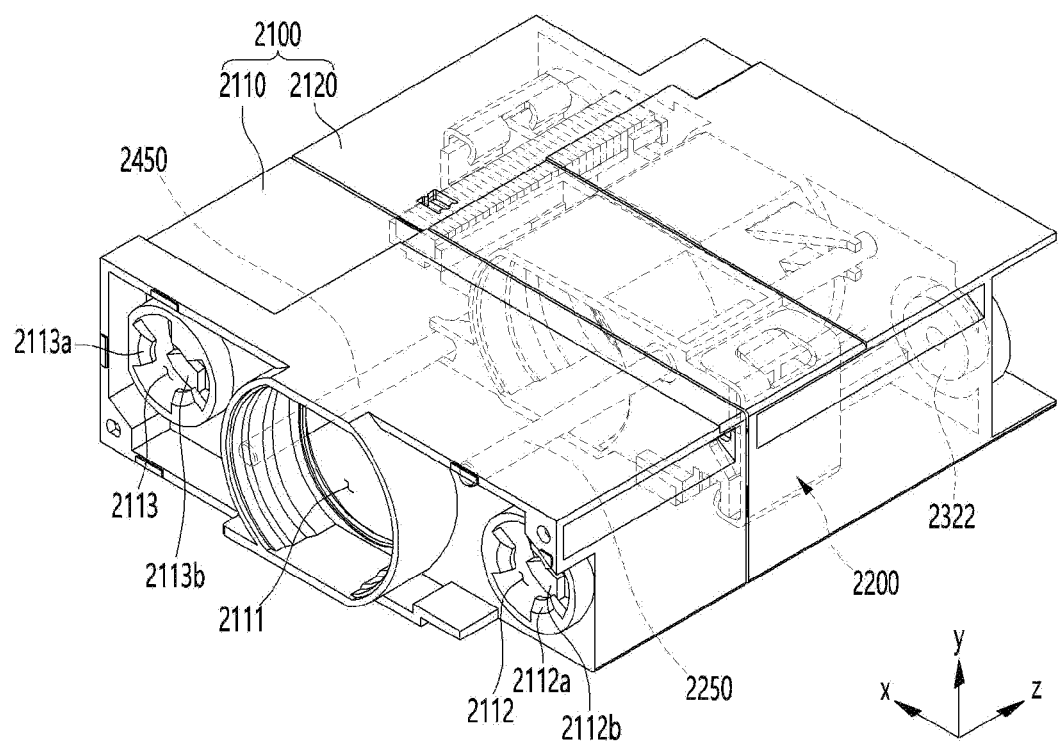

[FIG. 24]
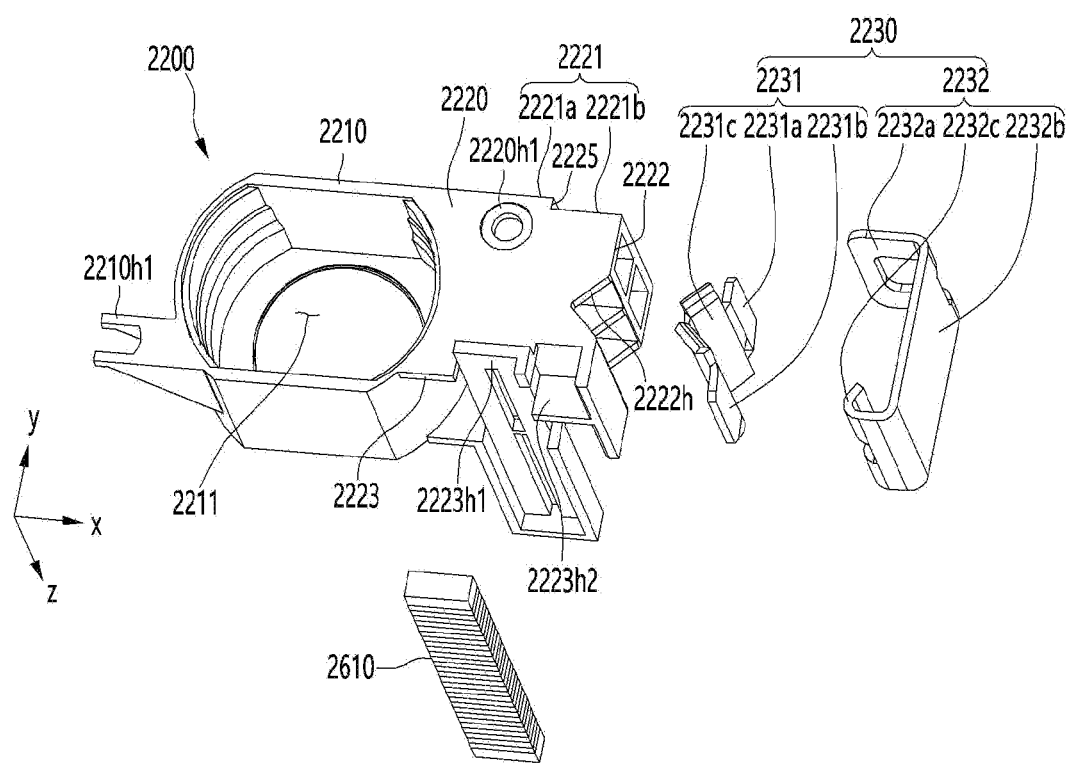

[FIG. 25]
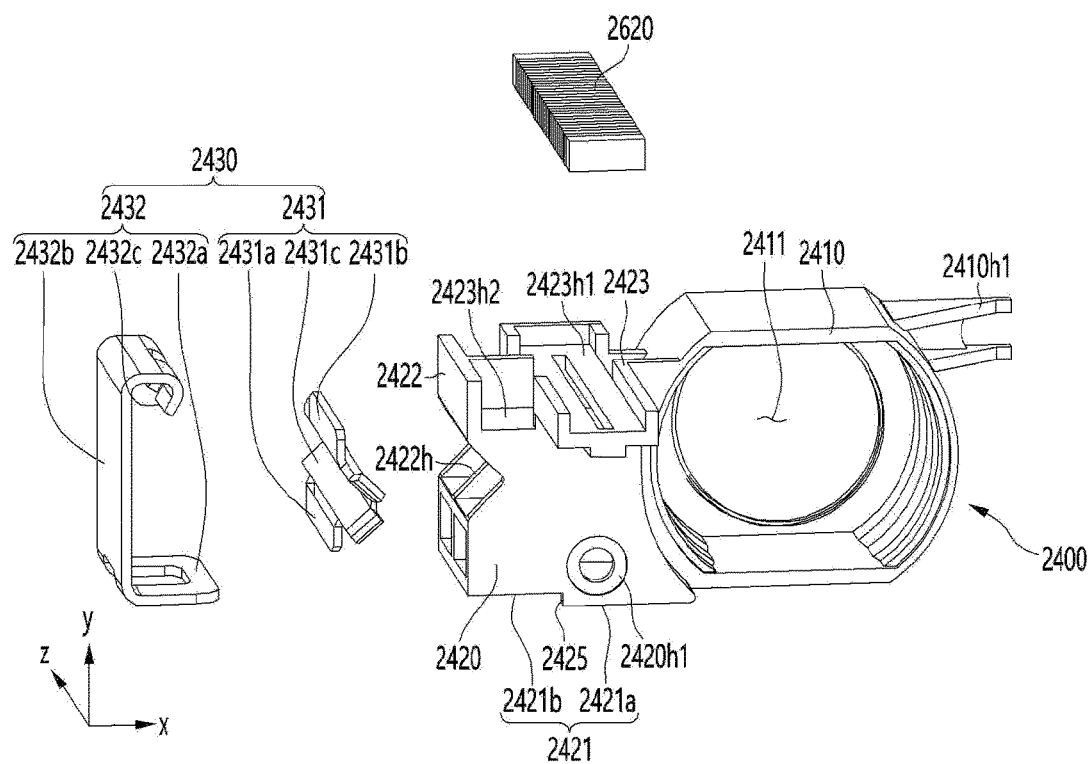

[FIG. 26]
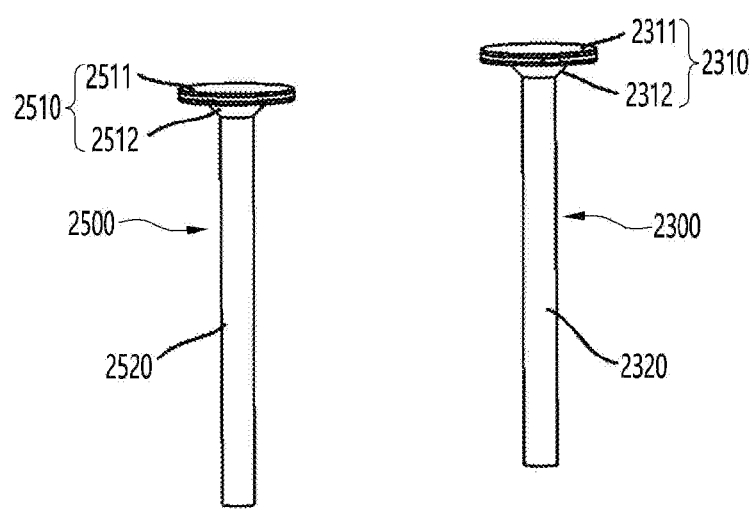

[FIG. 27]
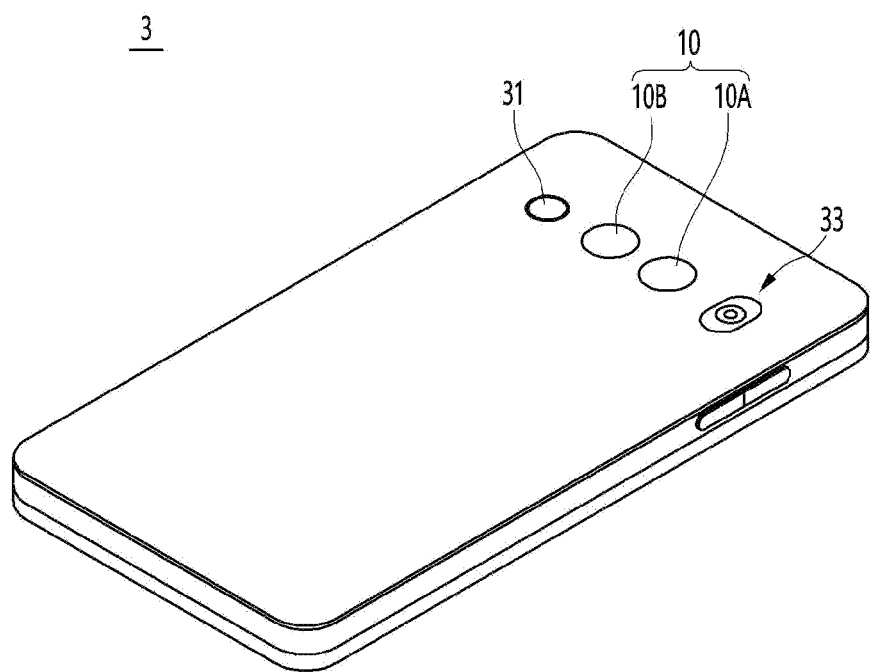

【FIG. 28】
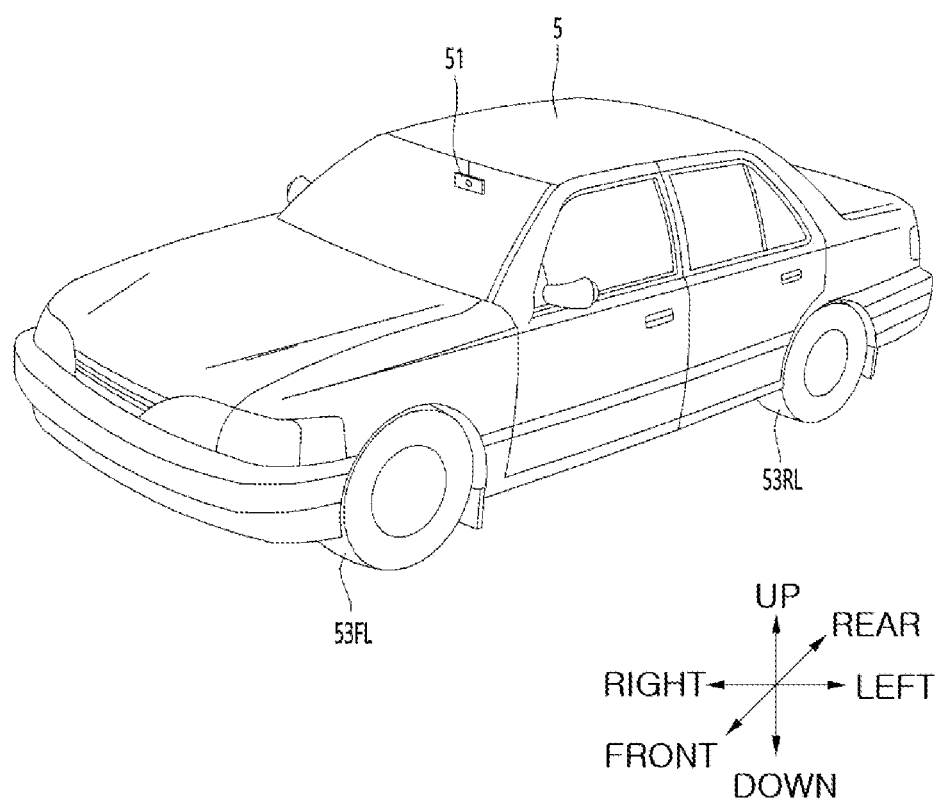

CAMERA ACTUATOR

CROSS-REFERENCE TO RELATED PATENT APPLICATIONS

This application is a U.S. National Stage Application under 35 U.S.C. § 371 of PCT Application No. PCT/KR2021/011108, filed Aug. 20, 2021, which claims priority to Korean Patent Application No. 10-2020-0104707, filed Aug. 20, 2020, whose entire disclosures are hereby incorporated by reference.

TECHNICAL FIELD

An embodiment relates to a camera actuator and a camera module.

BACKGROUND ART

A camera module captures a subject and stores it as an image or video, and is installed in various devices such as mobile terminals such as cell phones, laptops, drones, and vehicles.

In general, the device described above is equipped with a miniature camera module, and the camera module can perform an autofocus (AF) function of automatically adjusting the distance between the image sensor and the lens to align the focal lengths of the lenses. In addition, the camera module may perform a zooming function of zooming up or zooming out by increasing or decreasing the magnification of a distant subject through a zoom lens.

Meanwhile, a zoom actuator is used for a zooming function in the camera module. However, frictional torque is generated when the lens moves due to the mechanical movement of the actuator, and problems such as reduction in driving force, increase in power consumption, and deterioration in control characteristics occur due to this frictional torque.

In particular, in order to obtain the best optical properties by using a plurality of zoom lens groups in the camera module, not only alignment between the plurality of lens groups but also the alignment between the plurality of lens groups and the image sensor are required. However, if a decenter that a center of the spherical surface between lens groups deviates from the optical axis, or a tilt of a lens inclination phenomenon, or a phenomenon that the lens group and the central axis of the image sensor are not aligned, the angle of view may be changed or the focus may be out of focus such that these phenomena may adversely affect picture quality or resolution.

In addition, when an attempt is made to increase a spacing in a region where friction is generated in order to reduce friction torque resistance while moving the lens for the zoom function in the camera module, there is a technical problem in that intensifies the lens decent or the tilt of the lens at the reversal time of the zoom movement or the zoom movement.

In addition, recent camera modules employ image stabilization (IS) technology that corrects or prevents image shake due to camera movement caused by unstable fixing devices or user movement.

Such image stabilization (IS) technology includes an optical image stabilizer (OIS) technology and an image shake prevention technology using an image sensor. In this case, OIS technology is a technology that corrects motion by changing the path of light, and the image shake prevention technology using an image sensor is a technology that compensates movement by mechanical and electronic methods, and recently, OIS technology is being adopted more and more.

Meanwhile, the camera module may include a reflective member and a driving part capable of changing a path of light to implement the OIS function. The reflective member may be tilted-controlled by a driving force applied from the driving part, and a path of light may be changed during this process. For example, when the camera module detects a hand shake vibration waveform generated by a user, the reflective member may tilt to compensate for the hand shake vibration waveform. However, there is a problem in that a relatively small vibration waveform is generated or a deviation occurs between a hand shake vibration waveform and a waveform that compensates for it due to problems such as noise and sync of components. In this case, the optical properties of the camera module may be deteriorated, and the effect of the OIS function is insignificant.

Accordingly, a new camera module capable of solving the above problems is required.

DISCLOSURE

Technical Problem

An embodiment provides a camera actuator and camera modules with improved optical properties.

In addition, the embodiment provides a camera actuator and a camera module capable of effectively controlling vibration caused by hand shaking.

In addition, the embodiment provides a camera actuator and camera module having improved auto focus and high magnification zoom functions.

In addition, the embodiment provides a camera actuator and a camera module capable of preventing problems such as de-centering, tilting, friction, etc., which occur when the lens group is moved.

Technical problems to be solved by the proposed embodiments are not limited to the above-mentioned technical problems, and other technical problems not mentioned may be clearly understood by those skilled in the art to which the embodiments proposed from the following descriptions belong.

Technical Solution

A camera actuator according to an embodiment includes a housing; a prism part disposed in the housing; and a driving part disposed in the housing and tilting the prism part; wherein the driving part includes a first piezoelectric element disposed in a region overlapping in a first direction with respect to a center of the prism part; and a second piezoelectric element disposed in a region overlapping in a second direction different from the first direction with respect to the center of the prism part, and wherein the prism part is provided to be tiltable in the second direction by the first piezoelectric element, and is provided to be tiltable in the first direction by the second piezoelectric element.

In addition, the prism part includes a prism; and a prism mover disposed surrounding the prism, wherein the prism mover includes a first side part facing the driving part, and wherein the first side part includes a first protrusion part corresponding to the first piezoelectric element and a second protrusion part corresponding to the second piezoelectric element.

In addition, the first piezoelectric element contacts the first protrusion part, and the second piezoelectric element contacts the second protrusion part.

In addition, the camera actuator further includes a holder to which the prism part is coupled, wherein the holder includes a second side part corresponding to the first side part of the prism mover, and wherein the second side part includes a first holder hole corresponding to the first piezoelectric element and the first protrusion part, and a second holder hole corresponding to the second piezoelectric element and the second protrusion part.

In addition, the holder includes a rotation guide part into which a recess of the prism mover is fitted, and the recess of the prism mover and the rotation guide part include an inclined surface.

In addition, the camera actuator further includes an elastic part coupled to the holder and the prism part and pressurizing and supporting the prism part in a direction toward the second side part.

In addition, the driving part includes: a reinforcing plate; and a substrate part disposed on the reinforcing plate, and wherein the first piezoelectric element and the second piezoelectric element are electrically connected to the substrate part in a state attached to the reinforcing plate.

In addition, the substrate part includes an open hole exposing a region in which the first piezoelectric element and the second piezoelectric element are to be disposed on one surface of the reinforcing plate.

In addition, the camera actuator further includes an adhesive part disposed on one surface of the reinforcing plate exposed through the open hole, and the first piezoelectric element and the second piezoelectric element are attached on the reinforcing plate by the adhesive part.

In addition, the driving part includes a solder part electrically connecting the first piezoelectric element and the second piezoelectric element and the substrate part.

In addition, the substrate part includes a first region disposed in an accommodation space of the housing, and a second region extending from the first region and exposed to an outside of the base.

In addition, the housing includes a housing hole corresponding to the second region of the substrate part and a protrusion to which the second region of the substrate part is coupled.

In addition, the second region of the substrate part is coupled to the housing, and supports the driving part and the prism part to float within the accommodation space of the housing.

Advantageous Effects

The camera actuator and camera module according to the embodiment can effectively control vibration caused by hand shaking. In detail, the embodiment may include a driving part capable of controlling tilting of the prism part in a first axis or a second axis. In this case, the driving part may control the tilting of the prism part to the first axis or the second axis. The driving part may include a piezoelectric element. The driving part including the piezoelectric element may drive as much as a driving displacement generated by hand shaking vibration. The driving part including the piezoelectric element may tilt the prism part in units of 1 micron when current is supplied, and thus, minute hand shake can be efficiently corrected. As a result, it is possible to effectively control vibrations caused by hand shake, so that optical properties can be improved.

In addition, the camera actuator and camera module according to the embodiment may have improved optical properties. In detail, in the camera actuator and camera module according to the embodiment, the driving part for moving the lens group may include a piezoelectric element, and the lens group may be more precisely controlled by the driving part. In addition, the camera actuator and camera module according to the embodiment can minimize friction generated when the lens group is moved. Accordingly, the embodiment may provide more improved auto focus and zoom functions.

DESCRIPTION OF DRAWINGS

FIG. 1 is a perspective view of a first camera actuator according to an embodiment.

FIG. 2 is an exploded perspective view of the first camera actuator shown in FIG. 1.

FIG. 3 is an exploded perspective view of a driving module shown in FIG. 2.

FIG. 4 is a perspective view of a housing of a camera actuator according to an embodiment.

FIGS. 5 and 6 are perspective views of a prism part of a first camera actuator.

FIGS. 7 to 9B are perspective views of a holder of a first camera actuator.

FIG. 10 is a perspective view of an elastic part of a first camera actuator.

FIG. 11 is a coupling view of an elastic part, a prism part, and a holder of a first camera actuator.

FIG. 12 is an exploded perspective view of a driving part of a first camera actuator.

FIG. 13 is a perspective view of a substrate part constituting a drive part.

FIG. 14 is a perspective view of a driving part of a first camera actuator.

FIG. 15 is a coupling view of a driving part and a base.

FIGS. 16A to 16F are views showing a manufacturing method of a drive part in order of process.

FIG. 16G is a view showing a coupling relationship between a prism part and a driving part according to an embodiment.

FIG. 17 is an exemplary view showing an operation of a driving part of a first camera actuator according to an embodiment.

FIG. 18 is a coupling view of a first camera actuator and a second camera actuator according to an embodiment.

FIG. 19 is an exploded perspective view of a first camera actuator and a second camera actuator according to an embodiment.

FIG. 20 is an exploded perspective view of a second camera actuator according to an embodiment.

FIG. 21 is a cross-sectional view of a second camera actuator according to an embodiment.

FIG. 22 is a front view of a second camera actuator according to an embodiment.

FIG. 23 is a perspective view illustrating third and fourth driving parts disposed in a housing of a second camera actuator according to an embodiment.

FIGS. 24 and 25 are exploded perspective views of first and second driving parts according to an exemplary embodiment.

FIG. 26 is a perspective view of some components in a second camera actuator according to an embodiment.

FIG. 27 is a perspective view of a mobile terminal to which a camera module according to an embodiment is applied.

FIG. 28 is a perspective view of a vehicle to which a camera module according to an embodiment is applied.

MODES OF THE INVENTION

Hereinafter, embodiments of the present invention will be described in detail with reference to the accompanying drawings.

However, the spirit and scope of the present invention is not limited to a part of the embodiments described, and may be implemented in various other forms, and within the spirit and scope of the present invention, one or more of the elements of the embodiments may be selectively combined and substituted for use.

In addition, unless expressly otherwise defined and described, the terms used in the embodiments of the present invention (including technical and scientific terms may be construed the same meaning as commonly understood by one of ordinary skill in the art to which this invention belongs, and the terms such as those defined in commonly used dictionaries may be interpreted as having a meaning that is consistent with their meaning in the context of the relevant art.

Further, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements. In addition, when an element is described as being "connected", "coupled", or "contacted" to another element, it may include not only when the element is directly "connected" to, "coupled" to, or "contacted" to other elements, but also when the element is "connected", "coupled", or "contacted" by another element between the element and other elements.

In addition, when described as being formed or disposed "on (over)" or "under (below)" of each element, the "on (over)" or "under (below)" may include not only when two elements are directly connected to each other, but also when one or more other elements are formed or disposed between two elements. Further, when expressed as "on (over)" or "under (below)", it may include not only the upper direction but also the lower direction based on one element.

An optical axis direction used below may be defined as an optical axis direction of a lens coupled to a camera actuator and a camera module, and a vertical direction may be defined as a direction perpendicular to the optical axis.

A autofocus function used below may be defined a function to automatically focus on the subject by adjusting the distance from the image sensor by moving the lens in the optical axis direction according to the distance of the subject so that a clear image of the subject can be acquired by the image sensor.

Meanwhile, an auto focus may correspond to an AF. In addition, closed-loop auto focus (CLAF) control may be defined as real-time feedback control of the lens position by sensing the distance between the image sensor and the lens to improve focus adjustment accuracy.

In addition, before the description of the embodiment of the invention, a first direction may mean a x-axis direction shown in the drawings, a second direction may be a different direction from the first direction. For example, the second direction may mean a y-axis direction shown in the drawing in a direction perpendicular to the first direction. Also, a third direction may be different from the first and second directions. For example, the third direction may mean a z-axis direction shown in the drawing in a direction perpendicular to the first and second directions. Here, the third direction may mean an optical axis direction.

Hereinafter, a configuration of a camera module according to a present embodiment will be described with reference to the drawings.

FIG. 1 is a perspective view of a first camera actuator according to an embodiment, FIG. 2 is an exploded perspective view of the first camera actuator shown in FIG. 1, and FIG. 3 is an exploded perspective view of a driving module shown in FIG. 2.

The first camera actuator 1000 may be an Optical Image Stabilizer (OIS) actuator. The first camera actuator 1000 may change a path of light incident on the camera module 10.

Referring to FIGS. 1 to 3, the first camera actuator 1000 may include a housing 100 and a driving module 200 disposed on the housing 100.

In addition, the driving module 200 may include a prism part 300, a driving holder 400, an elastic part 500 and a driving part 600.

The first camera actuator 1000 according to the embodiment as described above includes a driving part 600. The driving part 600 includes a plurality of piezoelectric elements (to be described later) respectively disposed in a first axis direction and a second axis direction perpendicular to the first axis. The piezoelectric element of the driving part 600 contacts the prism part 300. In addition, the piezoelectric element may cause mechanical deformation by applied power. Specifically, the piezoelectric element may expand toward one side of the prism part 300 by applied power or contract in an opposite direction to the one side. For example, the piezoelectric element may expand or contract in an optical axis direction. In addition, the prism part 300 may be tilted in a first axis direction or a second axis direction by expansion and contraction operations of the piezoelectric element.

In addition, the first camera actuator 1000 may further include a cover member (not shown). The cover member (not shown) may include an accommodation space therein and at least one side thereof may be open. For example, the cover member may be disposed surrounding an outer surface of the housing. Preferably, a part of the driving part 600 may be disposed on an outer surface of the housing 100. For example, a part of the driving part 600 may be coupled to the housing 100. Specifically, a substrate part 630 of the driving part 600 may be disposed on the outer surface of the housing 100.

Specifically, the driving module 200 may be accommodated in an accommodation space of the housing 100. In this case, the driving module 200 may be disposed while floating within the accommodation space of the housing 100. Here, "floating" may mean that the driving module 200 is supported by the housing 100 by some components of the driving module 200 and other components other than the partial components are disposed in a floating state in the accommodation space. For example, only the substrate part 630 of the driving part 600 among components of the driving module 200 may be coupled to the housing 100. In addition, other components of the driving module 200 excluding the substrate part 630 may be supported by the substrate part 630 and placed in a floating state in the housing 100.

In addition, the cover member may be disposed surrounding a part of the driving part 600 disposed on the outer surface of the housing 100. Accordingly, the cover member may protect a part of the driving part 600, the housing 100, and the prism part 300. The cover member may have a structure in which a plurality of side surfaces connected to each other are open. The cover member may have a structure in which a front surface through which light is incident from an outside, a lower surface corresponding to the first camera actuator 1000, and a rear surface opposite to the front surface are open, and may provide a light movement path of the prism part 300 to be described later.

The cover member may include a rigid material. For example, the cover member may include a material such as resin or metal, and may support the housing 100 disposed in the accommodation space. For example, the cover member may surround and support the housing 100, the driving part 600, and the prism part 300.

Hereinafter, the first camera actuator 1000 according to the embodiment will be described in more detail.

FIGS. 4 to 17 are perspective views of each component of a first camera actuator according to an embodiment.

The first camera actuator 1000 according to the embodiment may include the housing 100 and the driving module 200. In addition, the driving module 200 may include a prism part 300, a holder 400, an elastic part 500 and a driving part 600.

The prism part 300 may include a prism 300b and a prism mover 300a.

In addition, the driving part 600 may include a reinforcing plate 610, a first adhesive part 620, a substrate part 630, a second adhesive part 640 and a piezoelectric element 650.

According to the embodiment, the driving part 600 may be disposed in an accommodation space within the housing 100. According to the embodiment, it has a driving part 600 disposed on the housing 100, and thus has a technical effect of providing an ultra-slim and subminiature camera actuator and a camera module including the same.

In addition, according to the embodiment, the prism part 300 can be precisely tilted using the piezoelectric element 650, and thus precise hand-shake correction is possible, thereby improving reliability of OIS operation.

The embodiment allows to solve the size limitation of the lens in the lens assembly of the optical system by disposing the driving part 600 only on one side of the prism part 300 when implementing OIS, and accordingly, there is a technical effect that can secure a sufficient amount of light.

In addition, the embodiment allows the tilting control of the prism part 300 to the first axis or the second axis using the driving part 600 stably disposed on the housing 100, and accordingly, there is a technical effect that can produce the best optical properties by minimizing the occurrence of a decentration or tilt phenomenon when implementing OIS.

In addition, the embodiment implements OIS by tilting the prism part 300 in the first axis or the second axis by providing a driving part 600, unlike moving a plurality of conventional solid lenses, and accordingly, there is a technical effect that enables OIS implementation with low power consumption.

Hereinafter, each component of the first camera actuator 1000 will be described in detail with reference to the accompanying drawings.
<Housing>

FIG. 4 is a perspective view of a housing of a camera actuator according to an embodiment.

Referring to FIG. 4, a housing 100 may include an accommodation space accommodating a driving module 200 including a prism part 300, a holder 400, an elastic part 500, and the driving part 600.

The housing 100 may include a plurality of side parts surrounding the accommodation space based on the accommodation space.

For example, the housing 100 may include a first side part 110, a second side part 120, a third side part 130, a fourth side part 140, and a fifth side part 150 disposed while surrounding the accommodation space.

The first side part 110 may correspond to a left side of the accommodation space. The second side part 120 may correspond to a right side of the accommodation space. The third side part 130 may correspond to a rear side of the accommodation space. The fourth side part 140 may correspond to a upper side of the accommodation space. The fifth side part 150 may correspond to a lower side of the accommodation space. As described above, the housing 100 may be provided surrounding a plurality of sides of the accommodation space. In this case, the housing 100 may expose at least one side part of the accommodation space. In the drawing, the housing 100 may expose a front side of the accommodation space. A front side of the housing 100 may be a space in which the driving module 200 is inserted into an accommodation space of the housing 100. For example, when the housing 100 and the driving module 200 are mutually coupled, the driving module 200 may be inserted through a front side of the housing 100.

In addition, the front side of the housing 100 may be an output part for light emitted through the prism part 300. Accordingly, in the embodiment, the front side of the housing 100 is opened so that the light reflected through the prism part 300 is provided to the second actuator (to be described later) while the driving module 200 is easily inserted into the accommodation space of the housing 100.

The housing 100 as described above may have a hexahedral shape, but is not limited thereto.

In addition, a first open region 141 may be provided on the fourth side part 140 of the housing 100. The first open region 141 may be an region corresponding to the prism part 300 of the driving module 200 disposed in the accommodation space of the housing 100. Preferably, the first open region 141 may be a light inlet for providing light to the prism part 300.

In addition, a second open region 151 may be formed on the fifth side part 150 of the housing 100. The second open region 151 may be an open region for exposing some components of the driving module 200 disposed in the accommodation space of the housing 100 to an outside of the housing 100. Preferably, the second open region 151 may expose a part of the substrate part 630 of the driving part 600 to the outside of the housing 100. Specifically, the substrate part 630 includes a first region (described later) disposed in the accommodation space of the housing 100 and a second region extending from the first region and disposed the outside of the housing 100 through the second open region 151. In addition, the driving module 200 may be supported on the housing 100 by the second region of the substrate part 630. In addition, components other than the second region of the substrate part 630 of the driving module 200 may be disposed floating in the accommodation space of the housing 100. For example, only the second region of the substrate part 630 among the components of the driving module 200 may contact the housing 100, and other components other than the second region may not contact the housing 100.

Meanwhile, the housing 100 may include a plurality of housing holes (not shown). The housing hole may be a through hole passing through inner and outer surfaces of each side part of the housing 100.

In addition, the housing 100 may include a protrusion (not shown) provided on at least one side part of the plurality of side parts. The protrusion (not shown) may include a coupling protrusion coupled to the second region of the substrate part 630.

Specifically, the housing 100 may include a coupling protrusion 152 provided on a lower surface of the fifth side part 150 and into which the substrate part 630 of the driving part 600 is fitted.

<Prism Part>

FIGS. 5 and 6 are perspective views of a prism part of a first camera actuator.

Specifically, FIG. 5 is an exploded perspective view of a prism part 300 of a first camera actuator according to an embodiment, and FIG. 6 is a perspective view of a prism mover 300a of a prism part 300 of FIG. 5.

Referring to FIGS. 5 and 6, the prism part 300 may be disposed in the housing 100. In detail, the prism part 300 may be disposed in the accommodation space of the housing 100.

The prism part 300 may include a prism 300b and a prism mover 300a disposed on the prism 300b.

The prism 300b may be a right-angle prism. The prism 300b may reflect a direction of light incident from an outside. That is, the prism 300b may change a path of light incident to the first camera actuator 1000 from the outside toward the second camera actuator 2000.

The prism mover 300a may be disposed under the prism 300b. The prism mover 300a may be disposed surrounding the prism 300b. At least one side part of the prism mover 300a may be open and may include an accommodation space therein. In detail, the prism mover 300a may have a structure in which a plurality of side parts connected to each other are open. For example, the prism mover 300a may have a structure in which a side part corresponding to the prism 300b is open, and may include an accommodation space defined as a first space 340 therein. For example, the prism mover 300a may have a structure in which an upper side and a front side are open. The opened upper side of the prism mover 300a may function as a light inlet for providing external light to the prism 300b. In addition, the opened front side of the prism mover 300a may function as a light output part providing light reflected through the prism 300b to a second camera actuator.

The prism mover 300a may include an inner surface 341. The inner surface 341 may be an inner surface constituting the first space 340. The first space 340 may have a shape corresponding to that of the prism 300b. An inner surface 341 of the first space 340 may directly contact the prism 300b. That is, the inner surface 341 of the first space 340 may be inclined to correspond to an inclination angle of the prism 300b.

The prism mover 300a may include a step (not shown). For example, the step may cover a part of the front side of the prism mover 300a. For example, the step may cover the front side of the prism mover 300a within a range not covering a light output region of the prism 300b. Accordingly, the prism 300b may contact the step while being disposed in the first space 340 of the prism mover 300a. Accordingly, it is possible to prevent the prism 300b from being separated from the prism mover 300a. However, the embodiment is not limited thereto, and an adhesive member (not shown) such as epoxy may be applied on the inner surface 341 of the first space 340. In addition, the prism 300b may be firmly fixed to the prism mover 300a by an adhesive force provided from the adhesive member (not shown).

The step may function as a guide and/or a seating part for the prism 300b.

In addition, a protrusion corresponding to the step may be provided on the outside of the prism 300b, but is not limited thereto.

A protrusion or one end of the prism 300b may be guided to the step of the prism mover 300a and disposed in the first space 340. Accordingly, the prism mover 300a can effectively support the prism 300b. In addition, the prism 300b may be seated at a set position and may have improved alignment characteristics within the prism mover 300a.

The prism part 300 may include a plurality of side parts. For example, the prism mover 300a of the prism part 300 may include a plurality of side parts. The prism mover 300a may include a first side part 310 corresponding to the first side part 110 of the housing 100. In addition, the prism mover 300a may include a second side part 320 corresponding to the second side part 120 of the housing 100. In addition, the prism mover 300a may include a third side part 330 corresponding to the third side part 130 of the housing 100.

The prism mover 300a may include a recess 370. The recess 370 may be provided on a lower side of the prism mover 300a. For example, the recess 370 may have a concave shape in a direction from a lower side of the prism mover 300a to an upper side.

The recess 370 may function as a coupling part for coupling the prism mover 300a to a holder 400 to be described later.

The recess 370 may include an inclined surface 371. When the prism mover 300a rotates around the second axis, the inclined surface 371 may guide the rotational motion along the second axis. For example, the prism mover 300a may be coupled with the holder 400 by inserting the recess 370 into a rotation guide part 440 of the holder 400, which will be described later. In addition, the prism mover 300a may be rotated by a driving force provided from the driving part 600 in a state in which the rotation guide part 440 is inserted into the recess 370. For example, the prism mover 300a may rotate around a second axis corresponding to a direction in which the rotation guide part 440 is disposed. In this case, the recess 370 includes the inclined surface 371 as described above. In addition, the inclined surface 371 may guide the rotation of the prism mover 300a more easily. For example, when the prism mover 300a rotates, the rotation guide part 440 can be rotated in a sliding manner corresponding to an inclination angle of the inclined surface 371, and thereby, it allows for an easier rotational motion to be achieved. For example, the prism mover 300a may be rotated by an angle corresponding to a slight change in driving force provided from the driving part 600. Meanwhile, as will be described later, a width of the recess 370 in an optical axis direction may be smaller than a width of the rotation guide part 440 in the optical axis direction. Accordingly, a predetermined separation portion G may be formed between the rotation guide part 440 and the recess 370 in a state in which the recess 370 is inserted in the rotation guide part 440. In addition, the prism mover 300a may rotate based on the first axis corresponding to a width of the separation portion G.

In conclusion, the recess 370 of the prism mover 300a may function as a coupling part for coupling the prism mover 300a to the holder 400, a rotation guide function for guiding rotation along the second axis, and function as a stopper to limit the rotation range when rotating along the first axis.

Meanwhile, a plurality of protrusions may be provided on an outer surface of a third side part 330 of the prism mover 300a.

The plurality of protrusions may include a first protrusion part 331 provided in a vertical direction (y-axis direction) based on a center point C of an outer surface of the third side part 330 of the prism mover 300a and a second protrusion part 332 formed in a left-right direction (x-axis direction) based on the center point (C).

The first protrusion part 331 and the second protrusion part 332 may have a semicircular shape with rounded ends, but are not limited thereto.

The first protrusion part 331 and the second protrusion part 332 may contact a piezoelectric element 650 of the driving part 600. In addition, the first protrusion part 331 and the second protrusion part 332 may function as rotational axes for rotating the prism mover 300a by a driving force provided from the piezoelectric element 650 in contact with the piezoelectric element 650 of the driving part 600.

The first protrusion part 331 and the second protrusion part 332 may be provided on an outer surface of the third side part 330 facing the driving part 600.

In addition, the first protrusion part 331 may contact a first piezoelectric element 651 of the driving part 600. Also, the second protrusion part 332 may contact a second piezoelectric element 652 of the driving part 600.

The first protrusion part 331 may include a first-first protrusion 331a and a first-second protrusion 331b arranged in a second direction or vertical direction corresponding to a y-axis based on the center point C of the outer surface of the third side part 330.

The first-first protrusion 331a and the first-second protrusion 331b may contact the first piezoelectric element 651 of the driving part 600. In addition, the prism mover 300a may rotate with a virtual line connecting the first-first protrusion 331a and the first-second protrusion 331b as a rotation axis. For example, the prism mover 300a may rotate by a driving force provided from the second piezoelectric element 652 using a virtual line connecting the first-first protrusion 331a and the first-second protrusion 331b as a rotation axis.

In addition, the second protrusion 332 includes a second-first protrusion 332a and a second-second protrusion 332b arranged in a first direction or a left and right direction corresponding to the x-axis based on the center point C of the third side part 330.

The second-first protrusion 332a and the second-second protrusion 332b may contact the second piezoelectric element 652 of the driving part 600. In addition, the prism mover 300a may rotate with a virtual line connecting the second-first protrusion 332a and the second-second protrusion 332b as a rotation axis. For example, the prism mover 300a may rotate by a driving force provided from the first piezoelectric element 651 using a virtual line connecting the second-first protrusion 332a and the second-second protrusion 332b as a rotation axis.

Meanwhile, the prism mover 300a may include a plurality of protrusion parts for coupling with the elastic part 500.

For example, a plurality of third protrusion part 350 may be formed on one side surface 311 of the first side part 310 of the prism mover 300a. The third protrusion part 350 may include a third-first protrusion 351 formed on an upper side of one side surface 311 of the first side part 310, and a third-second protrusion 352 spaced apart from the third-first protrusion 351 and provided on a lower side of the one side surface 311.

In addition, a fourth protrusion part 360 may be provided on one side surface 321 of the second side part 320 of the prism mover 300a. The fourth protrusion part 360 may include a fourth-first protrusion 361 formed on an upper side of one side surface 321 of the second side part 320, and a fourth-second protrusion 362 spaced apart from the fourth-first protrusion 361 and provided on the lower side of the one side surface 321.

An elastic part 500 may be fitted to the third protrusion part 350 and the fourth protrusion part 360. Specifically, the elastic part 500 may be fixed by an adhesive member (not shown) such as epoxy in a state of being fitted into the third protrusion part 350 and the fourth protrusion part 360.

<Holder>

FIGS. 7 to 9B are perspective views of the holder of the first camera actuator.

Referring to FIGS. 7, 8, 9A and 9B, the holder 400 may be disposed between the driving part 600 and the prism part 300 according to the embodiment.

The holder 400 may include a first side part 310 corresponding to the first side part 110 of the housing 100 and the first side part 310 of the prism mover 300a. In addition, the holder 400 may include a second side part 420 corresponding to the second side part 120 of the housing 100 and the second side part 320 of the prism mover 300a.

In addition, the holder 400 may include a third side part 430 corresponding to the third side part 130 of the housing 100 and the third side part 330 of the prism mover 300a.

The third side part 430 of the holder 400 may connect one end of the first side part 410 of the holder 400 and one end of the second side part 420 of the holder 400 to each other.

The holder 400 may include a rotation guide part 440.

The rotation guide part 440 may connect an inner surface of the first side part 410 of the holder 400 and an inner surface of the second side part 420 of the holder 400. The rotation guide part 440 may be spaced apart from the third side part 430 of the holder 400.

The rotation guide part 440 may be fitted in the recess 370 of the prism mover 300a. The rotation guide part 440 may guide rotation of the prism mover 300a. In addition, the rotation guide part 440 may limit the rotation of the prism mover 300a.

The rotation guide part 440 may include a flat surface 441 and an inclined surface 442 extending from the flat surface 441. The inclined surface 442 may correspond to the inclined surface 371 of the recess 370 of the prism mover 300a. When the prism mover 300a rotates around the second axis, the inclined surface 442 of the rotation guide part 440 may guide the rotational motion of the second axis. For example, the prism mover 300a may be coupled with the holder 400 by inserting the rotation guide part 440 of the holder 400 into the recess 370. In addition, the prism mover 300a may be rotated by a driving force provided from the driving part 600 in a state in which the rotation guide part 440 is inserted into the recess 370. For example, the prism mover 300a may rotate around a second axis corresponding to a direction in which the rotation guide part 440 is disposed. In this case, the inclined surface 442 of the holder 400 may guide the rotation of the prism mover 300a more easily. For example, when the prism mover 300a rotates, the rotation guide part 440 can be rotated in a sliding manner corresponding to an inclination angle of the inclined surface 371 of the recess 370 and the inclined surface 442 of the rotation guide part 440, and thereby, it allows for an easier rotational motion to be achieved. For example, the prism mover 300*a* may be rotated by an angle corresponding to a slight change in driving force provided from the driving part 600.

In addition, a width of the recess 370 in the optical axis direction may be smaller than a width of the rotation guide part 440 in the optical axis direction. Accordingly, a predetermined separation portion G may be formed between the rotation guide part 440 and the recess 370 in a state in which the recess 370 is inserted into the rotation guide part 440. In addition, the prism mover 300*a* may rotate based on the first axis corresponding to a width of the separation portion G.

In conclusion, the recess 370 of the prism mover 300*a* may function as a coupling part for coupling the prism mover 300*a* to the holder 400, a rotation guide function for guiding rotation along the second axis, and function as a stopper to limit the rotation range when rotating along the first axis.

Meanwhile, a plurality of holder holes may be formed in the third side part 430 of the holder 400.

The holder hole of the holder 400 may be a through hole passing through an outer surface and an inner surface of the third side part 430.

The holder hole of the holder 400 may be formed in a region corresponding to the piezoelectric element 650 of the driving part 600. The holder hole of the holder 400 may have a size and shape corresponding to that of the piezoelectric element 650 of the driving part 600. A part or the whole of the piezoelectric element 650 of the driving part 600 may be inserted into the holder hole of the holder 400 and disposed.

Specifically, the holder hole of the holder 400 may include a first holder hole 431 and a second holder hole 432.

The first holder hole 431 may include a first-first holder hole 431*a* and a first-second holder hole 431*b* that are spaced apart in the y-axis direction or the second direction or the vertical direction. The first holder hole 431 may correspond to the first protrusion part 331 of the prism mover 300*a* and the first piezoelectric element 651 of the piezoelectric element 650 of the driving part 600. In addition, the second holder hole 432 may correspond to the second protrusion part 332 of the prism mover 300*a* and the second piezoelectric element 652 of the piezoelectric element 650 of the driving part 600.

The first-first holder hole 431*a* may be formed in a region corresponding to the first-first protrusion 331*a* of the prism mover 300*a*. The first-first holder hole 431*a* may be formed in a region corresponding to the first-first piezoelectric element 651*a* of the piezoelectric element 650 of the driving part 600. The first-first holder hole 431*a* may correspond to a first solder part S1 fixing the first-first piezoelectric element 651*a* to the substrate part 630 of the driving part 600.

The first-second holder hole 431*b* may be formed in an region corresponding to the first-second protrusion 331*b* of the prism mover 300*a*. The first-second holder hole 431*b* may be formed in a region corresponding to the first-second piezoelectric element 651*b* of the piezoelectric element 650 of the driving part 600. The first-second holder hole 431*b* may correspond to the second solder part S2 fixing the first-second piezoelectric element 651*b* to the substrate part 630 of the driving part 600.

The second holder hole 432 may include a second-first holder hole 432*a* and a second-second holder hole 432*b* that are spaced apart in the x-axis direction or in the first direction or in the left-right direction. The second holder hole 432 may correspond to the second protrusion part 332 of the prism mover 300*a* and the second piezoelectric element 652 of the piezoelectric element 650 of the driving part 600.

The second-first holder hole 432*a* may be formed in an region corresponding to the second-first protrusion 332*a* of the prism mover 300*a*. The second-first holder hole 432*a* may be formed in a region corresponding to the second-first piezoelectric element 652*a* of the piezoelectric element 650 of the driving part 600. The second-first holder hole 432*a* may correspond to a third solder part S3 fixing the second-first piezoelectric element 652*a* to the substrate part 630 of the driving part 600.

The second-second holder hole 432*b* may be formed in an region corresponding to the second-second protrusion 332*b* of the prism mover 300*a*. The second-second holder hole 432*b* may be formed in a region corresponding to the second-second piezoelectric element 652*b* of the piezoelectric element 650 of the driving part 600. The second-second holder hole 432*b* may correspond to the fourth solder part S4 fixing the second-second piezoelectric element 652*b* to the substrate part 630 of the driving part 600.

The piezoelectric element 650 of the driving part 600 and the first and second protrusion parts 331 and 332 of the prism mover 300*a* may be disposed to directly face each other within the first holder hole 431 and the second holder hole 432 of the holder 400. For example, the piezoelectric element 650 of the driving part 600 is disposed in the first holder hole 431 and the second holder hole 432 of the holder 400, and accordingly, it may be disposed in direct contact with the first and second protrusion parts 331 and 332 of the prism mover 300*a*.

Meanwhile, the holder 400 may include a plurality of protrusion parts for coupling with the elastic part 500.

For example, a plurality of fifth protrusion parts 450 may be formed on one side surface of the first side part 410 of the holder 400. The fifth protrusion part 450 may include a fifth-first protrusion 451 formed on an upper side of one side surface of the first side part 410 and a fifth-second protrusion 452 spaced apart from the fifth-first protrusion 451 and formed on a lower side of the one side surface.

In addition, a sixth protrusion part 460 may be formed on one side surface of the second side part 420 of the holder 400. The sixth protrusion part 460 may include a sixth-first protrusion 461 formed on an upper side of one side surface of the second side part 420, and a sixth-second protrusion 362 spaced apart from the sixth-first protrusion 461 and formed on a lower side of the one side surface.

An elastic part 500 may be fitted to the fifth protrusion part 450 and the sixth protrusion part 460. Specifically, the elastic part 500 may be fixed by an adhesive member (not shown) such as epoxy in a state of being fitted into the fifth protrusion part 450 and the fourth protrusion part 460.

<Elastic Part>

FIG. 10 is a perspective view of an elastic part of a first camera actuator, and FIG. 11 is a coupling view of an elastic part, a prism part, and a holder of a first camera actuator.

Referring to FIGS. 10 and 11, the elastic part 500 may include a first elastic member 510 and a second elastic member 520.

The first elastic member 510 may be coupled to the prism mover 300*a* and the holder 400 at one side of the driving module 200. The second elastic member 520 may be coupled to the prism mover 300*a* and the holder 400 at the other side of the driving module 200.

The first elastic member 510 and the second elastic member 520 may press and support the prism mover 300*a* and furthermore the prism part 300 to the holder 400. For example, the first elastic member 510 and the second elastic member 520 may press and support the prism part 300 in a direction toward the third side part 430 of the holder 400 in the state where the prism part 300 is disposed on the holder 400.

The first elastic member 510 may include a first-first elastic region 511. In addition, the first elastic member 510 may include a first-second elastic region 512 spaced apart from the first-first elastic region 511. In addition, the first elastic member 510 may include a first-third elastic region 513 connecting the first-first elastic region 511 and the first-second elastic region 512. In addition, the first elastic member 510 may include a first-fourth elastic region 514 connecting the first-first elastic region 511 and the first-second elastic region 512 and spaced apart from the first-third elastic region 513.

The first-first elastic region 511 may be coupled to one side surface of the first side part 410 of the holder 400. To this end, the first-first elastic region 511 may have a shape corresponding to one side surface of the first side part 410 of the holder 400. In addition, the first-first elastic region 511 may include a first-first fastening hole 515 corresponding to the fifth-first protrusion 451 formed on one side surface of the first side part 410 of the holder 400. In addition, the first-first elastic region 511 may include a first-second fastening hole 516 corresponding to the fifth-second protrusion 452 formed on one side surface of the first side part 410 of the holder 400.

The first-second elastic region 512 may be coupled to one side surface 311 of the first side part 310 of the prism mover 300a. To this end, the first-second elastic region 512 may have a shape corresponding to one side surface 311 of the first side part 310 of the prism mover 300a. In addition, the first-second elastic region 512 may include a first-third fastening hole 517 corresponding to the third-first protrusion 351 formed on one side surface 311 of the first side part 310 of the prism mover 300a. In addition, the first-second elastic region 512 may include a first-fourth fastening hole 518 corresponding to the third-second protrusion 352 formed on one side surface 311 of the first side part 310 of the prism mover 300a.

The first-third elastic region 513 may connect the first-first elastic region 511 and the first-second elastic region 512. The first-third elastic region 513 may include at least one bending region. The first-fourth elastic region 514 may connect the first-first elastic region 511 and the first-second elastic region 512. The first-fourth elastic region 514 may include at least one bending region.

The first elastic member 510 presses and supports the prism mover 300a in a state of being fastened to the first side part 410 of the holder 400 and the first side part 310 of the prism mover 300a.

The second elastic member 520 may have a shape corresponding to that of the first elastic member 510. For example, the second elastic member 520 may have the same shape as the first elastic member 510.

The second elastic member 520 may include a second-first elastic region 521. In addition, the second elastic member 520 may include a second-second elastic region 522 spaced apart from the second-first elastic region 521. In addition, the second elastic member 520 may include a second-third elastic region 523 connecting the second-first elastic region 521 and the second-second elastic region 522. In addition, the second elastic member 520 may include a second-fourth elastic region 524 connecting the second-first elastic region 521 and the second-second elastic region 522 and spaced apart from the second-third elastic region 523.

The second-first elastic region 521 may be coupled to one side surface of the second side part 420 of the holder 400. To this end, the second-first elastic region 521 may have a shape corresponding to one side surface of the second side part 420 of the holder 400. In addition, the second-first elastic region 521 includes a second-first fastening hole 525 corresponding to the sixth-first protrusion 461 formed on one side surface of the second side part 420 of the holder 400. In addition, the second-first elastic region 521 may include a second-second fastening hole 526 corresponding to the sixth-second protrusion 462 formed on one side surface of the second side part 420 of the holder 400.

The second-second elastic region 522 may be coupled to one side surface 321 of the second side part 320 of the prism mover 300a. To this end, the second-second elastic region 522 may have a shape corresponding to one side surface 321 of the second side part 320 of the prism mover 300a. In addition, the second-second elastic region 522 may include a second-third fastening hole 527 corresponding to the fourth-first protrusion 361 formed on one side surface 311 of the second side part 320 of the prism mover 300a.

In addition, the second-second elastic region 522 may include a second-fourth fastening hole 528 corresponding to the fourth-second protrusion 362 formed on one side surface 321 of the second side part 320 of the prism mover 300a.

The second-third elastic region 523 may connect the second-first elastic region 521 and the second-second elastic region 522. The second-third elastic region 523 may include at least one bending region. The second-fourth elastic region 524 may connect the second-first elastic region 521 and the second-second elastic region 522. The second-fourth elastic region 524 may include at least one bending region.

The second elastic member 520 presses and supports the prism mover 300a in a state of being fastened to the second side part 420 of the holder 400 and the second side part 320 of the prism mover 300a.

<Driving Part>

FIGS. 12 to 16 are perspective views of a driving part of a first camera actuator according to an embodiment.

Specifically, FIG. 12 is an exploded perspective view of a driving part of a first camera actuator, FIG. 13 is a perspective view of a substrate part constituting a drive part, FIG. 14 is a perspective view of a driving part of a first camera actuator, FIG. 15 is a coupling view of a driving part and a base, FIGS. 16A to 16F are views showing a manufacturing method of a drive part in order of process, and FIG. 16G is a view showing a coupling relationship between a prism part and a driving part according to an embodiment.

Referring to FIGS. 12 to 16, the driving part 600 may include a reinforcing plate 610, a first adhesive part 620, a substrate part 630, a second adhesive part 640, and a piezoelectric element 650.

The reinforcing plate 610 may be anodized aluminum, but is not limited thereto. The reinforcing plate 610 may function to support the piezoelectric element 650 in order to mount the piezoelectric element 650 on the substrate part 630. In addition, the reinforcing plate 610 may contact the piezoelectric element 650 and thus function to transfer heat generated from the piezoelectric element 650 to an outside. In addition, the reinforcing plate 610 may serve to impart rigidity to the substrate part 630 on which the piezoelectric element 650 is mounted. The reinforcing plate 610 may be anodized to insulate the solder parts S1, S2, S3, and S4 electrically connecting the substrate part 630 and the piezoelectric element 650 to each other. Accordingly, the reinforcing plate 610 is insulated from the solder parts S1, S2, S3, and S4 to prevent a short circuit due to mutual electrical connection.

A first adhesive part 620 may be formed on one surface of the reinforcing plate 610. The first adhesive part 620 may be an adhesive tape, but is not limited thereto. The first adhesive part 620 may be formed to attach the substrate part 630 to the reinforcing plate 610. The first adhesive part 620 may include a plurality of open holes. The first adhesive part 620 may include a first open hole exposing a region to which the piezoelectric element 650 is to be attached on one surface of the reinforcing plate 610. Specifically, the first adhesive part 620 may include a first-first open hole 621 exposing a region where a first-first piezoelectric element 651a is to be disposed on one surface of the reinforcing plate 610. The first adhesive part 620 may include a first-second open hole 622 exposing a region on one surface of the reinforcing plate 610 where a first-second piezoelectric element 651b is to be disposed. The first adhesive part 620 may include a first-third open hole 623 exposing a region where a second-first piezoelectric element 652a is to be disposed on one surface of the reinforcing plate 610. The first adhesive part 620 may include a first-fourth open hole 624 exposing a region where a second-second piezoelectric element 652b is to be disposed on one surface of the reinforcing plate 610.

The substrate part 630 may be attached to one surface of the reinforcing plate 610 through the first adhesive part 620. The substrate part 630 may be electrically connected to the piezoelectric element 650 through solder parts S1, S2, S3, and S4. The substrate part 630 may supply power to the piezoelectric element 650 connected through the solder parts S1, S2, S3, and S4. In addition, the piezoelectric element 650 may mechanically deformed such as expansion or contraction by the supplied power. The substrate part 630 may include a circuit board having a wiring pattern that can be electrically connected, such as a rigid printed circuit board (Rigid PCB), a flexible printed circuit board (Flexible PCB), and a rigid flexible printed circuit board (Rigid Flexible PCB).

The substrate part 630 may be divided into a plurality of regions.

Specifically, the substrate part 630 may include a first region 631, a second region 632, and a third region 633.

The first region 631 of the substrate part 630 may be an region facing the third side part 430 of the holder 400. The first region 631 of the substrate part 630 may be a region disposed in the housing 100. The first region 631 of the substrate part 630 may be a region where the piezoelectric element 650 is disposed through the solder parts S1, S2, S3, and S4 by arranging the solder parts S1, S2, S3, and S4. A plurality of second open holes may be formed in the first region 631 of the substrate part 630. The plurality of second open holes may correspond to the plurality of first open holes formed in the first adhesive part 620. In addition, the plurality of second open holes may correspond to a region where the piezoelectric element 650 is disposed.

That is, the first region 631 of the substrate part 630 may include a second-first open hole 631-1 corresponding to the first-first open hole 621 and exposing a region where a first-first piezoelectric element 651a is to be disposed on one surface of the reinforcing plate 610. The first region 631 of the substrate part 630 may include a second-second open hole 631-2 corresponding to the first-second open hole 622 and exposing a region where the first-second piezoelectric element 651b is to be disposed on one surface of the reinforcing plate 610. The first region 631 of the substrate part 630 may include a second-third open hole 631-3 corresponding to the first-third open hole 623 and exposing a region where the second-first piezoelectric element 652a is to be disposed on one surface of the reinforcing plate 610. The first region 631 of the substrate part 630 may include a second-fourth open hole 631-4 corresponding to the first-fourth open hole 624 and exposing a region where the second-second piezoelectric element 652b is to be disposed on one surface of the reinforcing plate 610.

The second region 632 of the substrate part 630 may be a region coupled to the housing 100. The second region 632 of the substrate part 630 may be exposed to an outside of the housing 100 through the second open region 151 formed on the fifth side part 150 of the housing 100.

In addition, the second region 632 of the substrate part 630 may be exposed to the outside of the housing 100, and the housing 100 may include a coupling hole 632-1 fitted into the coupling protrusion 152 formed on a lower surface of the fifth side part 150. In this case, the substrate part 630 is disposed on the lower surface of the fifth side part 150 of the housing 100 in a state bent at 90 degrees with respect to the first region 631, and accordingly, the coupling hole 632-1 may be inserted into the coupling protrusion 152 and coupled to the housing 100.

The third region 633 of the substrate part may connect the first region 631 and the second region 632 of the substrate part 630. The third region 633 may be a bendable flexible region.

The second adhesive part 640 may be formed in a region where the piezoelectric element 650 is to be disposed on one surface of the reinforcing plate 610. For example, the second adhesive part 640 may be formed on one surface of the reinforcing plate 610 exposed through the first open hole of the first adhesive part 620 and the second open hole of the substrate part 630.

Specifically, the second adhesive part 640 may include a first adhesive member 641 formed on one surface of the reinforcing plate 610 exposed through the first-first open hole 621 and the second-first open hole 631-1.

The second adhesive part 640 may include a second adhesive member 642 formed on one surface of the reinforcing plate 610 exposed through the first-second open hole 622 and the second-second open hole 631-2.

The second adhesive part 640 may include a third adhesive member 643 formed on one surface of the reinforcing plate 610 exposed through the first-third open hole 623 and the second-third open hole 631-3.

The second adhesive part 640 may include a fourth adhesive member 644 formed on one surface of the reinforcing plate 610 exposed through the first-fourth open hole 624 and the second-fourth open hole 631-4.

The piezoelectric element 650 may be attached to one surface of the reinforcing plate 610 through the second adhesive part 640. In addition, the piezoelectric element 650 may be electrically connected to the substrate part 630 through the solder parts S1, S2, S3, and S4.

The piezoelectric element 650 may be disposed in direct or indirect contact with the prism mover 300a. The piezoelectric element 650 may be disposed in direct contact with the first protrusion part 331 and the second protrusion part 332 formed on the outer surface of the third side part 330 of the prism mover 300a.

The piezoelectric element 650 may include a material that causes mechanical deformation by applied power. The piezoelectric element 650 may include a piezo-electric device. The piezoelectric element 650 may include a ceramic material. For example, the piezoelectric element 650 may include at least one of ZnO, AlN, LiNbO4, lead antimony stannate, lead magnesium tantalate, lead nickel tantalate, titanates, tungstates, zirconates, lead zirconate titanate [Pb(ZrxTi1−x)O3(PZT)], lead lanthanum zirconate titanate (PLZT), lead niobium zirconate titanate (PNZT), BaTiO3, SrTiO3, lead magnesium niobate, lead nickel niobate, lead manganese niobate, lead zinc niobate, and niobates of lead, barium, bismuth, or strontium, including lead titanates.

The driving part 600 may include a plurality of piezoelectric elements 650. The plurality of piezoelectric elements 650 may include a first piezoelectric element 651 and a second piezoelectric element 652. The first piezoelectric element 651 and the second piezoelectric element 652 may be respectively disposed in the open hole of the substrate part 630 and the first adhesive part 620. Specifically, the first piezoelectric element 651 and the second piezoelectric element 652 may be attached to one surface of the reinforcing plate 610 through the second adhesive part 640.

The first piezoelectric element 651 may include a first-first piezoelectric element 651a and a first-second piezoelectric element 651b spaced apart in a vertical direction, a y-axis direction, or a second direction. The first-first piezoelectric element 651a and the first-second piezoelectric element 651b may be spaced apart from each other in the second direction. For example, the first piezoelectric element 651 may be disposed in one direction based on the center of the prism part 300.

The second piezoelectric element 652 may include a second-first piezoelectric element 652a and a second-second piezoelectric element 652b spaced apart in the left-right direction, the x-axis direction, or the first direction. In addition, the second piezoelectric element 652 may be disposed in another direction different from the one direction based on the center of the prism part 300. The one direction and the other direction may be perpendicular to the center of the prism part 300.

The first-first piezoelectric element 651a and the first-second piezoelectric element 651b may have the same shape and height. Also, the second-first piezoelectric element 652a and the second-second piezoelectric element 652b may have the same shape and height. In addition, the first-first piezoelectric element 651a, the first-second piezoelectric element 651b, the second-first piezoelectric element 652a, and the second-second piezoelectric element 652b may have the same height.

The first-first piezoelectric element 651a may be electrically connected to the substrate part 630 through the first solder part S1. The first-second piezoelectric element 651b may be electrically connected to the substrate part 630 through the second solder part S2. The second-first piezoelectric element 652a may be electrically connected to the substrate part 630 through the third solder part S3. The second-second piezoelectric element 652b may be electrically connected to the substrate part 630 through the fourth solder part S4.

A part or all of the piezoelectric element 650 may be disposed in a holder hole formed in the holder 400 in a state coupled to the holder 400.

At least a part of the first-first piezoelectric element 651a may be inserted into the first-first holder hole 431a of the holder 400 and may contact the first-first protrusion 331a of the prism mover 300a.

At least a part of the first-second piezoelectric element 651b may be inserted into the first-second holder hole 431b of the holder 400 to contact the first-second protrusion 331b of the prism mover 300a.

At least a part of the second-first piezoelectric element 652a may be inserted into the second-first holder hole 432a of the holder 400 to contact the second-first protrusion 332a of the prism mover 300a.

At least a part of the second-second piezoelectric element 652b may be inserted into the second-second holder hole 432b of the holder 400 to contact the second-second protrusion 332b of the prism mover 300a.

A method of manufacturing the driving part 600 is as follows.

Referring to FIGS. 16A to 16G, firstly, a reinforcing plate 610, which is a base member of the driving part 600, is prepared. The prepared reinforcing plate 610 may be anodized aluminum, but is not limited thereto. The reinforcing plate 610 may function to support the piezoelectric element 650 in order to mount the piezoelectric element 650 on the substrate part 630.

Next, the embodiment may form a first adhesive part 620 on one surface of the reinforcing plate 610. In this case, the first adhesive part 620 may be an adhesive tape, but is not limited thereto. At this time, since a temperature of 100° C. or more is applied during a soldering process of the piezoelectric element 650, the first adhesive part 620 is preferably formed of a thermosetting tape. The first adhesive part 620 may include a first open hole exposing a region to which the piezoelectric element 650 is to be attached on one surface of the reinforcing plate 610. Specifically, the first adhesive part 620 may include a first-first open hole 621 exposing a region where the first-first piezoelectric element 651a is to be disposed on one surface of the reinforcing plate 610. The first adhesive part 620 may include a first-second open hole 622 exposing a region on one surface of the reinforcing plate 610 where the first-second piezoelectric element 651b is to be disposed. The first adhesive part 620 may include a first-third open hole 623 exposing a region where the second-first piezoelectric element 652a is to be disposed on one surface of the reinforcing plate 610. The first adhesive part 620 may include a first-fourth open hole 624 exposing a region where the second-second piezoelectric element 652b is to be disposed on one surface of the reinforcing plate 610.

Next, the embodiment may proceed with a process of attaching the substrate part 630 to one surface of the reinforcing plate 610 through the first adhesive part 620.

The substrate part 630 may be divided into a plurality of regions. Specifically, the substrate part 630 may include a first region 631, a second region 632, and a third region 633.

In addition, a plurality of second open holes may be formed in the first region 631 of the substrate part 630. For example, the first region 631 of the substrate part 630 may include a second-first open hole 631-1 corresponding to the first-first open hole 621 and exposing a region where a first-first piezoelectric element 651a is to be disposed on one surface of the reinforcing plate 610. The first region 631 of the substrate part 630 may include a second-second open hole 631-2 corresponding to the first-second open hole 622 and exposing a region where the first-second piezoelectric element 651b is to be disposed on one surface of the reinforcing plate 610. The first region 631 of the substrate part 630 may include a second-third open hole 631-3 corresponding to the first-third open hole 623 and exposing a region where the second-first piezoelectric element 652a is to be disposed on one surface of the reinforcing plate 610. The first region 631 of the substrate part 630 may include a second-fourth open hole 631-4 corresponding to the first-fourth open hole 624 and exposing a region where the second-second piezoelectric element 652b is to be disposed on one surface of the reinforcing plate 610.

Next, according to the embodiment, a second adhesive part 640 may be formed on one surface of the reinforcing plate 610 in a region where the piezoelectric element 650 is to be disposed. For example, the second adhesive part 640 may be formed on one surface of the reinforcing plate 610 exposed through the first open hole of the first adhesive part 620 and the second open hole of the substrate part 630.

Specifically, the second adhesive part 640 may include a first adhesive member 641 formed on one surface of the reinforcing plate 610 exposed through the first-first open hole 621 and the second-first open hole 631-1. The second adhesive part 640 may include a second adhesive member 642 formed on one surface of the reinforcing plate 610 exposed through the first-second open hole 622 and the second-second open hole 631-2. The second adhesive part 640 may include a third adhesive member 643 formed on one surface of the reinforcing plate 610 exposed through the first-third open hole 623 and the second-third open hole 631-3. The second adhesive part 640 may include a fourth adhesive member 644 formed on one surface of the reinforcing plate 610 exposed through the first-fourth open hole 624 and the second-fourth open hole 631-4.

Next, the embodiment may proceed with a process of attaching the piezoelectric element 650 on the second adhesive part 640. Thereafter, the embodiment may proceed with a soldering process for electrically connecting the piezoelectric element 650 and the substrate part 630 through the solder parts S1, S2, S3, and S4.

FIG. 17 is an exemplary view showing an operation of a driving part of a first camera actuator according to an embodiment.

Referring to FIG. 17, the piezoelectric element 650 may cause mechanical deformation by applied power. In detail, the piezoelectric element 650 may expand or contract when set power is applied. For example, the piezoelectric element 650 may expand toward one side surface of the prism part 300 or contract in a direction opposite to the direction toward the one side surface. The piezoelectric element 650 may expand or contract in an optical axis direction.

During this process, the piezoelectric element 650 may tilt the prism part 300. In detail, the piezoelectric element 650 may control tilting of the prism part 300 in a first axis or a second axis by applied power.

For example, the prism 300b may be tilted in a first axis on the prism mover 300a. The prism part 300 can be rotated and moved in the left and right directions (refer to FIG. 17) with the first line L1 as an axis by the piezoelectric element 650. The prism part 300 may be rotated in the vertical direction (y-axis direction) by the second piezoelectric element 652.

In detail, the second-first piezoelectric element 652a may expand by applied power. In addition, the second-second piezoelectric element 652b may be contracted by applied power or maintained in a set shape when no power is applied. Accordingly, the prism part 300 may be tilted in a right direction (refer to FIG. 17) about a first line L1 by mechanical deformation of the second-first piezoelectric element 652a. Here, since no power is applied to the first-first piezoelectric element 651a and the first-second piezoelectric element 651b constituting the first piezoelectric element 651, deformation may not occur. Alternatively, the first-first piezoelectric element 651a and the first-second piezoelectric element 651b may be deformed by an applied power to provide a driving force for tilting the prism part 300 in the right direction.

In addition, the second-second piezoelectric element 652b may expand by applied power. In addition, the second-first piezoelectric element 652a may be contracted by applied power or maintained in a set shape when no power is applied. Accordingly, the prism part 300 may be tilted in a left direction (refer to FIG. 17) around the first line L1 by mechanical deformation of the piezoelectric element 650. Here, since no power is applied to the first-first piezoelectric element 651a and the first-second piezoelectric element 651b constituting the first piezoelectric element 651, deformation may not occur. Alternatively, the first-first piezoelectric element 651a and the first-second piezoelectric element 651b may be deformed by an applied power to provide a driving force for tilting the prism part 300 in the left direction.

The prism part 300 may be tilted around the second axis. The prism part 300 may rotate and move in a vertical direction (refer to FIG. 17) around the second line L2 as an axis by the piezoelectric element 650. The prism 410 may rotate and move in the left and right direction (x-axis direction) by at least one of the third piezoelectric element 533 and the fourth piezoelectric element 534.

In detail, the first-first piezoelectric element 651a may expand by applied power. In addition, the first-second piezoelectric element 651b may be contracted by applied power or maintained in a set shape when no power is applied. Accordingly, the prism part 300 may be tilted in a downward direction (refer to FIG. 17) around the second line L2 by mechanical deformation of the piezoelectric element 650. Here, since no power is applied to the second-first piezoelectric element 652a and the second-second piezoelectric element 652b, deformation may not occur. Alternatively, the second-first piezoelectric element 652a and the second-second piezoelectric element 652b may be deformed by a predetermined power applied to provide a driving force for tilting the prism part 300 in a downward direction.

In detail, the first-second piezoelectric element 651b may expand by applied power. In addition, the first-first piezoelectric element 651a may be contracted by applied power or maintained in a set shape when no power is applied. Accordingly, the prism part 300 may be tilted in an upward direction (refer to FIG. 17) around the second line L2 by mechanical deformation of the piezoelectric element 650. Here, since no power is applied to the second-first piezoelectric element 652a and the second-second piezoelectric element 652b, deformation may not occur. Alternatively, the second-first piezoelectric element 652a and the second-second piezoelectric element 652b may be deformed by a predetermined power applied to provide a driving force for tilting the prism part 300 in an upward direction.

The camera module 10 according to the embodiment may include one or a plurality of camera actuators. For example, the camera module 10 may include the above-described first camera actuator 1000, second camera actuator 2000, and a cover case 15 protecting the first camera actuator 1000 and the second camera actuator 2000.

The first camera actuator 1000 may be an Optical Image Stabilizer (OIS) actuator. In this case, light incident on the camera module 10 from the outside may first be incident on the first camera actuator 1000. In addition, the path of the light incident on the first camera actuator 1000 may be changed to be incident on the second camera actuator 2000. Subsequently, light passing through the second camera actuator 2000 may be incident on the image sensor 2900.

The second camera actuator 2000 may be a zoom and/or auto focus actuator. The second camera actuator 2000 may include a plurality of lenses. The second camera actuator 2000 may perform a zoom or auto focus function by moving at least one lens in an optical axis direction according to a control signal from a controller. The second camera actuator 2000 will be described in more detail through drawings to be described later.

<Second Camera Actuator>

FIG. 18 is a coupling view of a first camera actuator and a second camera actuator according to an embodiment, FIG. 19 is an exploded perspective view of a first camera actuator and a second camera actuator according to an embodiment, FIG. 20 is an exploded perspective view of a second camera actuator according to an embodiment, and FIG. 21 is a cross-sectional view of a second camera actuator according to an embodiment.

In addition, FIG. 22 is a front view of a second camera actuator according to an embodiment, and FIG. 23 is a perspective view illustrating third and fourth driving parts disposed in a housing of a second camera actuator according to an embodiment.

In addition, FIGS. 24 and 25 are exploded perspective views of first and second driving parts according to an exemplary embodiment, and FIG. 26 is a perspective view of some components in a second camera actuator according to an embodiment.

Referring to FIGS. 18 to 26, the second camera actuator 2000 according to the embodiment may include a second housing 2100, a first lens part 2105, a first lens barrel 2200, and a third driving part 2300, a second lens barrel 2400, and a fourth driving part 2500.

The second housing 2100 may form the exterior of the second camera actuator 2000. The second housing 2100 may have upper and lower partial regions open and may have a hexahedral shape.

The second housing 2100 may include an accommodation space therein. The first lens barrel 2200, the third driving part 2300, the second lens barrel 2400, and the fourth driving part 2500 may be accommodated in the accommodation space of the second housing 2100.

The second housing 2100 may include a first sub housing 2110 and a second sub housing 2120.

The first sub housing 2110 may include a first hole 2111. The first hole 2111 may be formed on one side of the first sub housing 2110. The first hole 2111 may be a hollow hole passing through an outside and an inside of the first sub housing 2110.

The first sub housing 2110 may further include a second hole 2112 and a third hole 2113. The second hole 2112 and the third hole 2113 may be disposed on one side of the first sub housing 2110. The second hole 2112 and the third hole 2113 may be hollow holes passing through the outside and the inside of the first sub housing 2110. The second hole 2112 and the third hole 2113 may be spaced apart from the first hole 2111. In detail, the first hole 2111 may be disposed between the second hole 2112 and the third hole 2113. The first hole 2111 may be disposed at equal intervals to the second hole 2112 and the third hole 2113.

The second hole 2112 may include a plurality of protrusions protruding from an inner circumferential surface of the second hole 2112 toward a center of the second hole 2112. For example, the plurality of protrusions may include a first protrusion 2112a disposed at an upper end of the second hole 2112 and a second protrusion 2112b disposed at a lower end of the second hole 2112 in the optical axis direction.

In detail, the first protrusion 2112a may include a plurality of first sub-protrusions (not shown) spaced apart from each other. The plurality of first sub-protrusions may be arranged at equal intervals from the center of the second hole 2112 along a circumference of a concentric circle shape. Also, the second protrusion 2112b may be spaced apart from the first protrusion 2112a in the optical axis direction. The second protrusion 2112b may be disposed below the first protrusion 2112a. The second protrusion 2112b may include a plurality of second sub-protrusions (not shown) spaced apart from each other. The plurality of second sub-protrusions may be arranged at equal intervals from the center of the second hole 2112 along a circumference of a concentric circle shape. The first protrusion 2112a and the second protrusion 2112b may provide a space in which a part of the third driving part 2300 to be described later, for example, a first buffer member 2321 is disposed.

The third hole 2113 may include a plurality of protrusions protruding from the inner circumferential surface of the third hole 2113 toward the center of the third hole 2113. The plurality of protrusions may include a third protrusion 2113a disposed at an upper end of the third hole 2113 and a fourth protrusion 2113b disposed at a lower end of the second hole 2112 with respect to the optical axis direction.

The third protrusion 2113a may include a plurality of third sub-protrusions (not shown) spaced apart from each other. The plurality of third sub-protrusions may be arranged at equal intervals from the center of the third hole 2113 along the circumference of a concentric circle. Also, the fourth protrusion 1134 may be spaced apart from the third protrusion 2113a in the optical axis direction. The fourth protrusion 2113b may include a plurality of fourth sub-protrusions (not shown) spaced apart from each other. The plurality of fourth sub-protrusions may be arranged at equal intervals from the center of the third hole 2113 along the circumference of a concentric circle. The third protrusion 2113a and the fourth protrusion 2113b may provide a space in which a portion of the fourth driving part 2500 to be described later, for example, a third buffer member 2521 is disposed.

The second sub housing 2120 may be disposed under the first sub housing 2110. In detail, the second sub housing 2120 may be disposed under the first sub housing 2110 in a third direction (z-axis, optical-axis direction). The second sub housing 2120 may be disposed closer to the image sensor 2900 to be described later than the first sub housing 2110. The first lens barrel 2200, the third driving part 2300, the second lens barrel 2400, and the fourth driving part 2500 may be disposed in the second sub housing 2120.

The second sub housing 2120 may be coupled to the first sub housing 2110. For example, the first sub housing 2110 and the second sub housing 2120 may be coupled by a separate fastening member (not shown) such as a screw. In addition, the first sub housing 2110 and the second sub housing 2120 may be coupled to each other by physical coupling of coupling jaws and coupling grooves respectively formed therein.

The first lens part 2105 is disposed in the second housing 2100 and may include at least one lens. For example, the first lens part 2105 may be disposed in the first sub housing 2110. In detail, the first lens part 2105 may be disposed in the first hole 2111 of the first sub housing 2110. For example, the first lens part 2105 may be coupled to the first sub housing 2110 by a thread formed on an inner circumferential surface of the first hole 2111.

The first lens barrel 2200 may be disposed in the second housing 2100. The first lens barrel 2200 may be disposed in the second sub housing 2120. The first lens barrel 2200 may be disposed under the first lens part 2105. For example, the first lens barrel 2200 may be disposed below the first lens part 2105 in the optical axis direction, and may be closer to the image sensor 2900 than the first lens part 2105. The first lens barrel 2200 may be coupled to the third driving part 2300. The first lens barrel 2200 may be moved in the second housing 2100 by the third driving part 2300. In detail, the first lens barrel 2200 may be moved in the optical axis direction by the third driving part 2300.

The first lens barrel 2200 may include a first barrel part 2210, a second lens part 2205, a first guide part 2220, and a first elastic part 2230.

The first barrel part 2210 may be disposed in a region overlapping the optical axis and may have an open shape on one surface and the other surface. For example, the first barrel part 2210 may have a cylindrical shape in which one surface and the other surface are open.

The first barrel part 2210 may include a first through hole 2211. The first through hole 2211 may be a through hole passing through one surface and the other surface of the first barrel part 2210. Here, one surface of the first barrel part 2210 may be a surface facing the first lens part 2105, and the other surface may be a surface opposite to the one surface and facing the image sensor 2900.

The second lens part 2205 may be disposed on the first barrel part 2210. In detail, the second lens part 2205 may be disposed in the first through hole 2211. For example, a thread may be formed on an inner circumferential surface of the first through hole 2211, and the second lens part 2205 may be coupled to the first barrel part 2210 by the thread.

The second lens part 2205 may include at least one lens. The second lens part 2205 may perform a zoom function. The second lens part 2205 may move in the optical axis direction. In detail, the second lens part 2205 may move in the optical axis direction with respect to the first lens part 2105.

The first guide part 2220 may extend outwardly from the first barrel part 2210. For example, the first guide part 2220 may extend from the first barrel part 2210 in a direction perpendicular to the optical axis, for example, in a first direction (x-axis direction).

The first guide part 2220 may include a first upper surface 2221, a first side surface 2222, and a first lower surface 2223.

The first upper surface 2221 may face an inner upper surface of the second housing 2100 to be described later. The first upper surface 2221 may face the inner upper surface of the second housing 2100 in the second direction (y-axis direction). The first upper surface 2221 may include a plurality of sub upper surfaces. In detail, the first upper surface 2221 may include a first sub upper surface 2221*a* and a second sub upper surface 2221*b* disposed lower in the second direction (y-axis direction) than the first sub upper surface 2221*a*. That is, the second sub upper surface 2221*b* may be disposed adjacent to the first lower surface 2223 than the first sub upper surface 2221*a*. At least one first fastening protrusion (not shown) may be disposed on the second sub upper surface 2221*b*. The first fastening protrusion may have a shape protruding upward on the second sub upper surface 2221*b*. The first fastening protrusion may be inserted into a first fixing groove (not shown) formed in a first elastic part 2230 to be described later.

In addition, the first upper surface 2221 may include a first stepped surface 2225 disposed between the first sub upper surface 2221*a* and the second sub upper surface 2221*b*. The first stepped surface 2225 may be connected to ends of the first sub upper surface 2221*a* and the second sub upper surface 2221*b*. The first stepped surface 2225 may be defined as the first stepped part 2225. That is, the first upper surface 2221 may include the first sub upper surface 2221*a*, the second sub upper surface 2221*b*, and the first stepped part 2225 and may have a stepped structure.

The first lower surface 2223 may face an inner lower surface of the second housing 2100 to be described later. A first groove 2223*h*1 may be provided on the first lower surface 2223. The first groove 2223*h*1 may have a concave shape in a direction from the first lower surface 2223 to the first upper surface 2221. A first magnetic scaler 2610 to be described later may be disposed in the first groove 2223*h*1.

In addition, a second groove 2223*h*2 may be provided on the first lower surface 2223. The second groove 2223*h*2 may be spaced apart from the first groove 2223*h*1. The second groove 2223*h*2 may be disposed in an edge region of the first lower surface 2223. The second groove 2223*h*2 may provide a region in which a portion of the first elastic part 2230, which will be described later, is disposed. In detail, the second groove 2223*h*2 may provide a region in which the first elastic part 2230 is mounted and fixed.

The first side surface 2222 may be disposed between the first upper surface 2221 and the first lower surface 2223. In detail, the first side surface 2222 may be a surface connecting the first upper surface 2221 and the first lower surface 2223. In more detail, the first side surface 2222 may be a surface connecting the second sub upper surface 2221*b* and the first lower surface 2223. The first side surface 2222 may face a second inner surface of the second sub housing 2120 to be described later.

A first recess 2222*h* may be provided on the first side surface 2222. The first recess 2222*h* may have a concave shape in a direction from the first side surface 2222 to the first barrel part 2210. Also, the first recess 2222*h* may have a groove shape extending in the optical axis direction (z-axis direction). The first recess 2222*h* may have a V-shape when viewed from a front.

The first guide part 2220 may include a first insertion hole 2220*h*1. The first insertion hole 2220*h*1 may be a hole passing through one surface and the other surface of the first guide part 2220. Here, one surface of the first guide part 2220 may be a surface facing the first lens part 2105, and the other surface may be a surface opposite to the one surface and facing the image sensor 2900.

A first pin 2250 may be disposed in the first insertion hole 2220*h*1. The first pin 2250 may be disposed to pass through the first insertion hole 2220*h*1. The first pin 2250 has a shape extending in the optical axis direction (z-axis direction), and may have a longer optical axis direction length than the first lens barrel 2200. The first pin 2250 may be coupled to at least one of the first sub housing 2110 and the second sub housing 2120. The first lens barrel 2200 may move the first pin 2250 as a movement axis in the optical axis direction. Through this, the second lens part 2205 disposed in the first lens barrel 2200 may perform a zoom function and/or an autofocus function.

The first elastic part 2230 may be disposed on the first guide part 2220. For example, the first elastic part 2230 may be disposed on the first upper surface 2221, the first lower surface 2223, and the first side surface 2222 of the first guide part 2220. The first elastic part 2230 may be coupled to the first guide part 2220.

The first elastic part 2230 may include a first elastic member 2231 and a second elastic member 2232.

The first elastic member 2231 may be coupled to the first guide part 2220. The first elastic member 2231 may be disposed at a set position on the first side surface 2222.

The first elastic member 2231 may have a shape corresponding to the first side surface 2222. For example, the first elastic member 2231 may include a first region 2231a, a second region 2231b, and a third region 2231c.

The first region 2231a and the second region 2231b may be provided on the first side surface 2222 of the first guide part 2220 and may be spaced apart from each other. The first region 2231a and the second region 2231b may be provided on a region of the first side surface 2222 in which the first recess 2222h is not disposed.

The third region 2231c may be disposed between the first region 2231a and the second region 2231b to connect the two regions 2231a and 2231b. The third region 2231c may be disposed in a region corresponding to the first recess 2222h. The third region 2231c may have a V-shape corresponding to the first recess 2222h.

The second elastic member 2232 may be disposed on the first guide part 2220. The second elastic member 2232 may be coupled to the first guide part 2220.

The second elastic member 2232 may include a fourth region 2232a, a fifth region 2232b, and a sixth region 2232c.

The fourth region 2232a may be provided on the first upper surface 2221 of the first guide part 2220. In detail, the fourth region 2232a may be provided on the second sub upper surface 2221b of the first guide part 2220. The fourth region may include a first fixing groove (not shown). The first fixing groove may be disposed in a region corresponding to the first fastening protrusion, and may have a shape corresponding to the first fastening protrusion.

The fifth region 2232b may be connected to the fourth region 2232a. For example, the fifth region 2232b may be bent at one end of the fourth region 2232a and disposed on the first side surface 2222 of the first guide part 2220. The fifth region 2232b may be disposed on the first elastic member 2231. The fifth region 2232b may be parallel to the first region 2231a and the second region 2231b. The fifth region 2232b may be disposed to cover the first elastic member 2231.

The sixth region 2232c may be connected to the fifth region 2232b. For example, the sixth region 2232c may be bent at one end of the fifth region and disposed on the first lower surface 2223 of the first guide part 2220. A portion of the sixth region 2232c may be inserted into the second groove 2232 disposed on the first lower surface 2223.

That is, the second elastic member 2232 may be physically coupled to the first guide part 2220 as the first fixing groove formed in the fourth region 2232a engages with the first fastening protrusion, the sixth region 2232c is inserted into the second groove 2232. Accordingly, the first elastic part 2230 may maintain a state firmly coupled to the first guide part 2220.

In addition, the first lens barrel 2200 may further include a first guide groove 2210h1. The first guide groove 2210h1 may be provided in a region extending outwardly from the first barrel part 2210. The first guide groove 2210h1 may be provided in a region corresponding to a second pin 2450 to be described later. The first guide groove 2210h1 may provide a space into which the second pin 2450 is inserted. The first lens barrel 2200 may move in the optical axis direction by the first pin 2250 and the second pin 2450. In this case, the first guide groove 2210h1 may have an open shape at one side. For example, the first guide groove 2210h1 may have an open shape at one side facing the first inner surface of the second housing 2100. Accordingly, friction and vibration generated when the first lens barrel 2200 is moved by the third driving part 2300 can be minimized.

The second camera actuator 2000 may include a third driving part 2300. The third driving part 2300 may be disposed in the second housing 2100. The third driving part 2300 may be coupled to the first lens barrel 2200. The third driving part 2300 may move the first lens barrel 2200 in the optical axis direction (z-axis direction).

The third driving part 2300 may include a first piezoelectric element 2310, a first extension bar 2320, a first buffer member 2321, and a second buffer member 2322.

The first piezoelectric element 2310 may include a piezoelectric device. For example, the first piezoelectric element 2310 may include a material that causes mechanical deformation by an applied power. The first piezoelectric element 2310 may contract or expand by an applied voltage and may cause mechanical deformation in a set direction. For example, the first piezoelectric element 2310 may generate a vibration while causing mechanical deformation in the optical axis direction (z-axis direction) by an applied power.

The first piezoelectric element 2310 may include a first disk part 2311 and a first protrusion 2512. The first disk part 2311 may have a plate shape and may be disposed on the second hole 2112. For example, the first disk part 2311 may be disposed on the first protrusion 2112a of the second hole 2112. In detail, the first disk part 2311 may be disposed on the plurality of first sub-protrusions. The first protrusion 2112a may support the first disk part 2311.

The first protrusion 2512 may be disposed under the first disk part 2311. In detail, the first protrusion 2512 may be disposed under the first disk part 2311 in the third direction (z-axis direction) and may be connected to the first disk part 2311. A portion of the first protrusion 2512 may be disposed in the second hole 2112. The first protrusion 2512 may have a shape protruding toward the image sensor 2900. A width (x-axis, y-axis direction) of the first protrusion 2512 may change toward the optical axis direction. For example, the width of the first protrusion 2512 may decrease as it approaches the image sensor 2900.

The first extension bar 2320 may extend in the optical axis direction. The first extension bar 2320 may be disposed parallel to the optical axis and may be connected to the first piezoelectric element 2310. For example, an upper end of the first extension bar 2320 may be connected to the first protrusion 2512. In addition, the lower end of the first extension bar 2320 may be inserted into the lower end of the second housing 2100, for example, a fourth hole (not shown) formed at the lower end of the second sub housing 2120.

In addition, one region of the first extension bar 2320 may be connected to the first lens barrel 2200. For example, the first extension bar 2320 may be connected to the first lens barrel 2200 by the first elastic part 2230. In detail, the first extension bar 2320 may be disposed between the first elastic member 2231 and the second elastic member 2232. In more detail, the first extension bar 2320 may be disposed between the third region 2231c of the first elastic member 2231 and the fifth region 2232b of the second elastic member 2232. The first extension bar 2320 may be fixed by the elastic force of the first elastic member 2231 and the second elastic member 2232.

The first extension bar 2320 may transmit the vibration generated by the first piezoelectric element 2310 to the first lens barrel 2200. The first lens barrel 2200 may move upward or downward (z-axis direction, optical-axis direction) according to the vibration direction of the first extension bar 2320. Through this, the second lens part 2205 in the first lens barrel 2200 may move to perform a zooming function of zooming up or zooming out.

The first buffer member 2321 may be disposed on the first extension bar 2320. The first buffer member 2321 may be disposed on an upper region of the first extension bar 2320.

The first buffer member 2321 may be disposed in the second hole 2112 of the second housing 2100. For example, the first buffer member 2321 may be disposed between the first protrusion 2112a and the second protrusion 2112b of the second hole 2112. The first buffer member 2321 may be fixed to a position set by the first protrusion 2112a and the second protrusion 2112b. In addition, the first buffer member 2321 may include a through hole into which the first extension bar 2320 is inserted.

The second buffer member 2322 may be disposed on the first extension bar 2320. The second buffer member 2322 may be disposed on a lower region of the first extension bar 2320. The second buffer member 2322 may be spaced apart from the first buffer member 2321 in the optical axis direction. The second buffer member 2322 may be disposed in a fourth hole (not shown) of the second housing 2100. The second buffer member 2322 may be disposed to be inserted into the fourth hole. The second buffer member 2322 may include a through hole into which the first extension bar 2320 is inserted.

The first buffer member 2321 and the second buffer member 2322 may prevent noise caused by the vibration of the first extension bar 2320. In addition, the first buffer member 2321 and the second buffer member 2322 may prevent the first extension bar 2320 from being deformed or damaged by an external impact.

The second lens barrel 2400 may be disposed in the second housing 2100. The second lens barrel 2400 may be disposed in the second sub housing 2120. The second lens barrel 2400 may be disposed under the first lens barrel 2200. For example, the second lens barrel 2400 may be disposed below the first lens barrel 2200 in the optical axis direction, and may be closer to the image sensor 2900 than the first lens barrel 2200. The second lens barrel 2400 may be coupled to the fourth driving part 2500. The second lens barrel 2400 may be moved in the second housing 2100 by the fourth driving part 2500. In detail, the second lens barrel 2400 may be moved in the optical axis direction by the fourth driving part 2500.

The second lens barrel 2400 may include a second barrel part 2410, a third lens part 2405, a second guide part 2420, and a second elastic part 2430.

The second barrel part 2410 is disposed in a region overlapping the optical axis and may have an open shape on one side and the other side. For example, the second barrel part 2410 may have a cylindrical shape in which one surface and the other surface are open.

The second barrel part 2410 may include the second through hole 2411. The second through hole 2411 may be a through hole passing through one surface and the other surface of the second barrel part 2410. Here, one surface of the second barrel part 2410 may be a surface facing the first lens barrel 2200, and the other surface may be a surface opposite to the one surface and facing the image sensor 2900.

The third lens part 2405 may be disposed on the second barrel part 2410. In detail, the third lens part 2405 may be disposed in the second through hole 2411. For example, a thread may be formed on an inner circumferential surface of the second through hole 2411, and the third lens part 2405 may be coupled to the second barrel part 2410 by the thread.

The third lens part 2405 may include at least one lens. The third lens part 2405 may perform an auto focus function. The third lens part 2405 may move in the optical axis direction. In detail, the third lens part 2405 may move in the optical axis direction with respect to the first lens part 2105. The third lens part 2405 may move separately from the second lens part 2205. Also, the distance at which the third lens part 2405 can move in the optical axis direction may be the same as or different from that of the second lens part 2205.

The second guide part 2420 may extend outwardly from the second barrel part 2410. For example, the second guide part 2420 may extend from the second barrel part 2410 in a direction perpendicular to the optical axis, for example, in a first direction (x-axis direction). In this case, the second guide part 2420 may extend in a direction opposite to the first guide part 2220. For example, the first guide part 2220 may extend in a +x-axis direction from the first barrel part 2210, and the second guide part 2420 may extend in a −x-axis direction from the second barrel part 2410.

The second guide part 2420 may include a second lower surface 2421, a second side surface 2422, and a second upper surface 2423.

The second upper surface 2423 may face the inner upper surface 122 of the second housing 2100. The second upper surface 2423 may face an inner upper surface of the second housing 2100 in the second direction (y-axis direction). A third groove 2423h1 may be disposed on the second upper surface 2423. The third groove 2423h1 may have a concave shape in a direction from the second upper surface 2423 to the second lower surface 2421. A second magnetic scaler 2620 to be described later may be disposed in the third groove 2423h1.

In addition, a fourth groove 2423h2 may be disposed on the second upper surface 2423. The fourth groove 2423h2 may be spaced apart from the third groove 2423h1. The fourth groove 2423h2 may be disposed in an edge region of the second upper surface 2423. The fourth groove 2423h2 may provide a region in which a portion of the second elastic part 2430, which will be described later, is disposed. In detail, the fourth groove 2423h2 may provide a region in which the second elastic part 2430 is mounted and fixed.

The second lower surface 2421 may face an inner lower surface of the second housing 2100. The second lower surface 2421 may face the inner lower surface of the second housing 2100 in the second direction (y-axis direction). The second lower surface 2421 may include a plurality of sub lower surfaces. In detail, the second lower surface 2421 may include a first sub-lower surface 2421a and a second sub-lower surface 2421b disposed on the first sub-lower surface 2421a in the second direction (y-axis direction). That is, the second sub lower surface 2421b may be disposed adjacent to the second upper surface 2423 than the first sub lower surface 2421a. At least one second fastening protrusion (not shown) may be disposed on the second sub lower surface 2421b. The second fastening protrusion may have a shape protruding downward from the second sub-lower surface 2421b. The second fastening protrusion may be inserted into a second fixing groove (not shown) formed in a second elastic part 2430 to be described later.

In addition, the second lower surface 2421 may include a second stepped surface 2425 disposed between the first sub lower surface 2421a and the second sub lower surface 2421b. The second stepped surface 2425 may be connected to ends of the first sub-lower surface 2421a and the second sub-lower surface 2421b. The second stepped surface 2425 may be defined as the second stepped part 2425. That is, the second lower surface 2421 may include the first sub lower surface 2421a, the second sub lower surface 2421b, and the second stepped part 2425 and may have a stepped structure.

The second side surface 2422 may be disposed between the second upper surface 2423 and the second lower surface 2421. In detail, the second side surface 2422 may be a surface connecting the second upper surface 2423 and the second lower surface 2421. In more detail, the second side surface 2422 may be a surface connecting the second sub lower surface 2421b and the second upper surface 2423. The second side surface 2422 may face a first inner surface of the second sub housing 2120 to be described later.

A second recess 2422h may be disposed on the second side surface 2422. The second recess 2422h may have a concave shape from the second side surface 2422 toward the second barrel part 2410. Also, the second recess 2422h may have a groove shape extending in the optical axis direction (z-axis direction). The second recess 2422h may have a V-shape when viewed from the front.

The second guide part 2420 may include a second insertion hole 2420h1. The second insertion hole 2420h1 may be a hole passing through one surface and the other surface of the second guide part 2420. Here, one surface of the second guide part 2420 may be a surface facing the first lens barrel 2200, and the other surface may be a surface opposite to the one surface and facing the image sensor 2900.

A second pin 2450 may be disposed in the second insertion hole 2420h1. The second pin 2450 may be disposed to pass through the second insertion hole 2420h1. The second pin 2450 may have a shape extending in the optical axis direction (z-axis direction). The second pin 2450 may be spaced apart from the first pin 2250 and may be parallel to the first pin 2250. The second pin 2450 may have a length in the optical axis direction longer than that of the second lens barrel 2400. The second pin 2450 may be coupled to at least one of the first sub housing 2110 and the second sub housing 2120. The second lens barrel 2400 may move the second pin 2450 as a movement axis in the optical axis direction. Through this, the third lens part 2405 disposed in the second lens barrel 2400 may perform a zoom function and/or an autofocus function.

The second elastic part 2430 may be disposed on the second guide part 2420. For example, the second elastic part 2430 may be disposed on the second upper surface 2423, the second lower surface 2421, and the second side surface 2422 of the second guide part 2420. The second elastic part 2430 may be coupled to the second guide part 2420.

The second elastic part 2430 may include a third elastic member 2431 and a fourth elastic member 2432.

The third elastic member 2431 may be coupled to the second guide part 2420. The third elastic member 2431 may be disposed at a set position on the second side surface 2422.

The third elastic member 2431 may have a shape corresponding to the second side surface 2422. For example, the third elastic member 2431 may include a seventh region 2431a, an eighth region 2431b, and a ninth region 2431c.

The seventh region 2431a and the eighth region 2431b may be disposed on the second side surface 2422 of the second guide part 2420 and may be spaced apart from each other. The seventh region 2431a and the eighth region 2431b may be disposed on a region of the second side surface 2422 in which the second recess 2422h is not disposed.

The ninth region 2431c may be disposed between the first region 2231a and the second region 2231b to connect the two regions 2431a and 2431b. The ninth region 2431c may be disposed in a region corresponding to the second recess 2422h. The ninth region 2431c may have a V-shape corresponding to the second recess 2422h.

The fourth elastic member 2432 may be disposed on the second guide part 2420. The fourth elastic member 2432 may be coupled to the second guide part 2420.

The fourth elastic member 2432 may include a tenth region 2432a, an eleventh region 2432b, and a twelfth region 2432c.

The tenth region 2432a may be disposed on the second lower surface 2421 of the second guide part 2420. In detail, the tenth region 2432a may be disposed on the second sub lower surface 2421b of the second guide part 2420. The tenth region may include a second fixing groove (not shown). The second fixing groove may be disposed in a region corresponding to the second fastening protrusion, and may have a shape corresponding to the second fastening protrusion.

The eleventh region 2432b may be connected to the tenth region 2432a. For example, the eleventh region 2432b may be bent at one end of the tenth region 2432a and disposed on the second side surface 2422 of the second guide part 2420. The eleventh region 2432b may be disposed on the third elastic member 2431. The eleventh region 2432b may be parallel to the seventh region 2431a and the eighth region 2431b. The eleventh region 2432b may be disposed to cover the third elastic member 2431.

The twelfth region 2432c may be connected to the eleventh region 2432b. For example, the twelfth region 2432c may be bent at one end of the eleventh region and disposed on the second upper surface 2423 of the second guide part 2420. A portion of the twelfth region 2432c may be inserted into the second groove 2232 disposed on the second upper surface 2423.

That is, the fourth elastic member 2432 may be physically coupled to the second guide part 2420 as the twelfth region 432c is inserted into the fourth groove 2423h2 while the second fixing groove formed in the seventh region 2431a is coupled to the second fastening protrusion. Accordingly, the second elastic part 2430 can maintain a state firmly coupled to the second guide part 2420.

In addition, the second lens barrel 2400 may further include a second guide groove 2410h1. The second guide groove 2410h1 may be disposed in a region extending outwardly from the second barrel part 2410. The second guide groove 2410h1 may be disposed in a region corresponding to the first pin 2250. The second guide groove 2410h1 may provide a space into which the first pin 2250 is inserted. The second lens barrel 2400 may move in the optical axis direction by the first pin 2250 and the second pin 2450. In this case, the second guide groove 2410h1 may have an open shape at one side. For example, the second guide groove 2410h1 may have an open side facing the second inner surface of the second housing 2100. Accordingly, friction and vibration generated when the second lens barrel 2400 is moved by the fourth driving part 2500 can be minimized.

The second camera actuator 2000 may include a fourth driving part 2500. The fourth driving part 2500 may be disposed in the second housing 2100. The fourth driving part 2500 may be coupled to the second lens barrel 2400. The fourth driving part 2500 may move the second lens barrel 2400 in the optical axis direction (z-axis direction).

The fourth driving part 2500 may include a second piezoelectric element 2510, a second extension bar 2520, a third buffer member 2521, and a fourth buffer member 2522.

The second piezoelectric element 2510 may include a piezo-electric device. For example, the second piezoelectric element 2510 may include a material that causes mechanical deformation by an applied voltage. The second piezoelectric element 2510 may contract or expand by an applied power and may cause mechanical deformation in a set direction. For example, the second piezoelectric element 2510 may generate vibration while causing mechanical deformation in the optical axis direction (z-axis direction) by an applied power.

The second piezoelectric element 2510 may include a second disk part 2511 and a second protrusion part 2512. The second disk part 2511 has a plate shape and may be disposed on the third hole 2113. For example, the second disk part 2511 may be disposed on the third protrusion 2113a of the third hole 2113. In detail, the second disk part 2511 may be disposed on the plurality of third sub-protrusions. The third protrusion 2113a may support the second disk part 2511.

The second protrusion part 2512 may be disposed under the second disk part 2511. In detail, the second protrusion part 2512 may be disposed under the second disk part 2511 in the third direction (z-axis direction) and may be connected to the second disk part 2511. A portion of the first protrusion 2512 may be disposed in the third hole 2113. The second protrusion part 2512 may have a shape protruding toward the image sensor 2900. The width (x-axis, y-axis direction) of the second protrusion part 2512 may change toward the optical axis direction. For example, the width of the second protrusion part 2512 may decrease as it approaches the image sensor 2900.

The second extension bar 2520 may extend in the optical axis direction. The second extension bar 2520 may be disposed parallel to the optical axis and may be connected to the second piezoelectric element 2510. For example, an upper end of the second extension bar 2520 may be connected to the second protrusion part 2512. In addition, the lower end of the second extension bar 2520 may be inserted into the lower end of the second housing 2100, for example, a fifth hole (not shown) formed at the lower end of the second sub housing 2120.

In addition, one region of the second extension bar 2520 may be connected to the second lens barrel 2400. For example, the second extension bar 2520 may be connected to the second lens barrel 2400 by the second elastic part 2430. In detail, the second extension bar 2520 may be disposed between the third elastic member 2431 and the fourth elastic member 2432. In more detail, the second extension bar 2520 may be disposed between the ninth region 2431c of the third elastic member 2431 and the eleventh region 2432b of the fourth elastic member 2432. The second extension bar 2520 may be fixed by the elastic force of the third elastic member 2431 and the fourth elastic member 2432.

The second extension bar 2520 may transmit the vibration generated by the second piezoelectric element 2510 to the second lens barrel 2400. The second lens barrel 2400 may move upward or downward (z-axis direction, optical-axis direction) according to the vibration direction of the second extension bar 2520. Through this, the third lens part 2405 in the second lens barrel 2400 may move to perform a zooming function of zooming up or out.

The third buffer member 2521 may be disposed on the second extension bar 2520. The third buffer member 2521 may be disposed on an upper region of the second extension bar 2520. The third buffer member 2521 may be disposed in the third hole 2113 of the second housing 2100. For example, the third buffer member 2521 may be disposed between the third protrusion 2113a and the fourth protrusion 2113b of the third hole 2113. The third buffer member 2521 may be fixed to a position set by the third protrusion 2113a and the fourth protrusion 2113b. In addition, the third buffer member 2521 may include a through hole into which the second extension bar 2520 is inserted.

The fourth buffer member 2522 may be disposed on the second extension bar 2520. The fourth buffer member 2522 may be disposed on a lower region of the second extension bar 2520. The fourth buffer member 2522 may be spaced apart from the third buffer member 2521 in the optical axis direction. The fourth buffer member 2522 may be disposed in a fifth hole (not shown) of the second housing 2100. The fourth buffer member 2522 may be disposed to be inserted into the fifth hole. The second buffer member 2322 may include a through hole into which the second extension bar 2520 is inserted.

The third buffer member 2521 and the fourth buffer member 2522 may prevent noise caused by the vibration of the second extension bar 2520. In addition, the third buffer member 2521 and the fourth buffer member 2522 may prevent the second extension bar 2520 from being deformed or damaged by an external impact.

The second camera actuator 2000 may include a first magnetic scaler 2610, a first sensing part (not shown), a second magnetic scaler 2620, and a second sensing part (not shown).

The first magnetic scaler 2610 may be disposed on the first lens barrel 2200. For example, the first magnetic scaler 2610 may be disposed on the first lower surface 2223. In detail, the first magnetic scaler 2610 may be disposed in the first groove 2223h1 of the first lens barrel 2200. The first magnetic scaler 2610 may move along the optical axis direction together with the first lens barrel 2200.

The first magnetic scaler 2610 may include a plurality of magnets. For example, the N pole and the S pole of the first magnetic scaler 2610 may be alternately disposed in the optical axis direction.

The first sensing part may be disposed adjacent to the first magnetic scaler 2610. For example, the first sensing part may be disposed facing the first magnetic scaler 2610 in a first direction (x-axis direction) or a second direction (y-axis direction). The first sensing part may detect a position of the first magnetic scaler 2610. Through this, the first sensing part can detect the position and movement of the first lens barrel 2200 moving together with the first magnetic scaler 2610.

The second magnetic scaler 2620 may be disposed on the second lens barrel 2400. For example, the second magnetic scaler 2620 may be disposed on the second upper surface 2423. In detail, the second magnetic scaler 2620 may be disposed in the third groove 2423h1 of the second lens barrel 2400. The second magnetic scaler 2620 may move along the optical axis direction together with the second lens barrel 2400.

The second magnetic scaler 2620 may include a plurality of magnets. For example, the N pole and the S pole of the second magnetic scaler 2620 may be alternately disposed in the optical axis direction.

In addition, the second sensing part may be disposed adjacent to the second magnetic scaler 2620. For example, the second sensing part may be disposed facing the second magnetic scaler 2620 in a first direction (x-axis direction) or a second direction (y-axis direction). The second sensing part may detect a position of the second magnetic scaler 2620. Through this, the second sensing part can detect the position and movement of the second lens barrel 2400 moving together with the second magnetic scaler 2620.

In addition, although not shown in the drawings, the second camera actuator 2000 according to the embodiment may further include a gyro sensor (not shown). The gyro sensor may be disposed in the second housing 2100. The gyro sensor may detect a movement of a user using the camera actuator.

The second camera actuator 2000 according to the embodiment may include a second substrate 2800. The second substrate 2800 may be disposed on the second housing 2100. The second substrate 2800 may be disposed to surround a partial region of the second housing 2100. For example, the second substrate 2800 may be disposed to surround a portion of the outer side of the second sub housing 2120. The second substrate 2800 may provide power or current to components disposed in the second housing 2100. That is, the second substrate 2800 may be a circuit board, and may include a circuit board having a wiring pattern that can be electrically connected, such as a rigid printed circuit board (Rigid PCB), a flexible printed circuit board (Flexible PCB), and a rigid flexible printed circuit board (Rigid Flexible PCB). The second substrate 2800 may be electrically connected to the first substrate 310 described above.

The second substrate 2800 may include a first end 2810. The first end 2810 may be disposed on the first piezoelectric element 2310 of the third driving part 2300. For example, the first end 2810 may be disposed on the first disk part 2311 of the first piezoelectric element 2310. In detail, the first end 2810 may be disposed on one surface of the first disk part 2311. Also, the first end 2810 may be disposed on the second piezoelectric element 2510 of the fourth driving part 2500. For example, the second end 2820 may be disposed on the second disk part 2511 of the second piezoelectric element 2510. In detail, the first end 2810 may be disposed on one surface of the second disk part 2511.

The second substrate 2800 may include a second end 2820. The first end 2810 may be spaced apart from the first end 2810. Also, the second end 2820 may be disposed in a region that does not overlap the first end 2810 in the optical axis direction.

The second end 2820 may be disposed on the first piezoelectric element 2310 of the third driving part 2300. For example, the second end 2820 may be disposed on the first disk part 2311 of the first piezoelectric element 2310. In detail, the first end 2810 may be disposed on the other surface opposite to one surface of the first disk part 2311. Also, the second end 2820 may be disposed on the second piezoelectric element 2510 of the fourth driving part 2500. For example, the second end 2820 may be disposed on the second disk part 2511 of the second piezoelectric element 2510. In detail, the second end 2820 may be disposed on the other surface opposite to one surface of the second disk part 2511.

That is, the second substrate 2800 may supply power to the first piezoelectric element 2310 and the second piezoelectric element 2510. Accordingly, the third driving part 2300 and the fourth driving part 2500 may drive the first lens barrel 2200 and the second lens barrel 2400 by the applied power, respectively.

As described above, the second camera actuator 2000 according to the embodiment includes a third driving part 2300 and a fourth driving part 2500 including a piezoelectric element, and the first and second lens barrels 2200 and 2400 may move in the optical axis direction by the third and fourth driving parts 2300 and 2500. However, the embodiment is not limited thereto, and the third and fourth driving parts 2300 and 2500 may include Voice Coli Motor (VCM) or a shape memory alloy. In this case, the third and fourth driving parts 2300 and 2500 may move the first and second lens barrels 2200 and 2400 by using the electromagnetic force of the VCM or the physical change of the shape memory alloy.

The second camera actuator 2000 according to the embodiment may include an image sensor 2900. The image sensor 2900 may collect light passing through the first lens part 2105, the second lens part 2205, and the third lens part 2405 in order, and convert the light into an image. The image sensor 2900 may be disposed such that an optical axis of the lens parts 2105, 2205, and 2405 coincides with the optical axis. The optical axis of the image sensor 2900 and the optical axis of the lens may be aligned.

FIG. 27 is a perspective view of a mobile terminal to which a camera module according to an embodiment is applied.

Referring to FIG. 27, the mobile terminal 3 may include a camera module 10, an autofocus device 31, and a flash module 33 provided on a rear side.

The camera module 10 may include an image capturing function and an auto focus function. For example, the camera module 10 may include an auto-focus function using an image.

The camera module 10 processes an image frame of a still image or a moving image obtained by an image sensor in a shooting mode or a video call mode. The processed image frame may be displayed on a predetermined display unit and stored in a memory. A camera (not shown) may also be disposed on the front of the mobile terminal body.

For example, the camera module 10 may include a first camera module 10A and a second camera module 10B. In this case, at least one of the first camera module 10A and the second camera module 10B may include the aforementioned camera module, for example, the camera module 10 according to FIGS. 1 to 26. Accordingly, the camera module 10 may implement an OIS function together with a zoom function and an autofocus function.

The auto focus device 31 may include an auto focus function using a laser. The auto focus device 31 may be mainly used in a condition in which the auto focus function using the image of the camera module 10 is deteriorated, for example, in proximity of 10 m or less or in a dark environment. The autofocus device 31 may include a light emitting unit including a vertical cavity surface emitting laser (VCSEL) semiconductor device and a light receiving unit that converts light energy such as a photodiode into electrical energy.

The flash module 33 may include a light emitting device emitting light therein. The flash module 33 may be operated by a camera operation of a mobile terminal or by a user's control.

Next, FIG. 28 is a perspective view of the vehicle 5 to which the camera module according to the embodiment is applied. For example, FIG. 28 is an external view of a vehicle including a vehicle driving assistance device to which the camera module 10 according to the embodiment is applied.

Referring to FIG. 28, the vehicle 5 according to the embodiment may include wheels 53FL and 53RL that rotate by a power source and a predetermined sensor. The sensor may be the camera sensor 51, but is not limited thereto.

The camera 51 may be a camera sensor to which the camera module according to the embodiment, for example, the camera module 10 according to FIGS. 1 to 37 is applied.

The vehicle 5 of the embodiment may acquire image information through a camera sensor 51 that captures a front image or a surrounding image, and it is possible to determine a lane non-identification situation using the image information, and generate a virtual lane when the lane is not identified.

For example, the camera sensor 51 may acquire a front image by photographing the front of the vehicle 5, and a processor (not shown) may obtain image information by analyzing an object included in the front image.

For example, when an object such as a median, curb, or street tree corresponding to a lane, an adjacent vehicle, a driving obstacle, and an indirect road marking is captured in the image captured by the camera sensor 51, the processor may detect such an object and include it in the image information.

In this case, the processor may further supplement the image information by acquiring distance information from the object detected through the camera sensor 51. The image information may be information about an object photographed in an image.

The camera sensor 51 may include an image sensor and an image processing module. The camera sensor 51 may process a still image or a moving image obtained by an image sensor (eg, CMOS or CCD). The image processing module may process a still image or a moving image obtained through the image sensor, extract necessary information, and transmit the extracted information to the processor.

In this case, the camera sensor 51 may include a stereo camera to improve the measurement accuracy of the object and further secure information such as the distance between the vehicle 5 and the object, but is not limited thereto.

Features, structures, effects, etc. described in the above embodiments are included in at least one embodiment, and it is not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and variations should be interpreted as being included in the scope of the embodiments.

In the above, the embodiment has been mainly described, but this is only an example and does not limit the embodiment, and those of ordinary skill in the art to which the embodiment pertains will appreciate that various modifications and applications not illustrated above are possible without departing from the essential characteristics of the present embodiment. For example, each component specifically shown in the embodiment can be implemented by modification. And the differences related to these modifications and applications should be interpreted as being included in the scope of the embodiments set forth in the appended claims.

The invention claimed is:

1. A camera actuator, comprising:
   a housing;
   a prism part disposed in the housing; and
   a driving part disposed in the housing and tilting the prism part, wherein the driving part includes:
      a substrate part;
      a reinforcing plate disposed on the substrate part; and
      a plurality of piezoelectric elements disposed on the reinforcing plate, wherein the substrate part includes an open hole exposing a region in which the plurality of piezoelectric elements are to be disposed on one surface of the reinforcing plate, and wherein the plurality of piezoelectric elements are electrically connected to the substrate part in a state attached to the reinforcing plate through the open hole.

2. The camera actuator of claim 1, wherein the plurality of piezoelectric elements includes:
   a first piezoelectric element disposed in a region overlapping in a first direction with respect to a center of the prism part; and
   a second piezoelectric element disposed in a region overlapping in a second direction different from the first direction with respect to the center of the prism part, the prism part is provided to be tiltable in the second direction by the first piezoelectric element, and is provided to be tiltable in the first direction by the second piezoelectric element.

3. The camera actuator of claim 2, wherein the prism part includes:
   a prism; and
   a prism mover disposed surrounding the prism, wherein the prism mover includes a first side part facing the driving part, and wherein the first side part includes a first protrusion part corresponding to the first piezoelectric element and a second protrusion part corresponding to the second piezoelectric element.

4. The camera actuator of claim 3, wherein the first piezoelectric element contacts the first protrusion part, and the second piezoelectric element contacts the second protrusion part.

5. The camera actuator of claim 3, further comprising:
   a holder to which the prism part is coupled, wherein the holder includes a second side part corresponding to the first side part of the prism mover, and wherein the second side part includes a first holder hole corresponding to the first piezoelectric element and the first protrusion part, and a second holder hole corresponding to the second piezoelectric element and the second protrusion part.

6. The camera actuator of claim 5, wherein the holder includes a rotation guide part into which a recess of the prism mover is fitted, and wherein the recess of the prism mover and the rotation guide part include an inclined surface.

7. The camera actuator of claim 5, further comprising:
   an elastic part coupled to the holder and the prism part and pressurizing and supporting the prism part in a direction toward the second side part.

8. The camera actuator of claim 2, wherein the open hole exposes a region in which the first piezoelectric element and the second piezoelectric element are to be disposed on the one surface of the reinforcing plate.

9. The camera actuator of claim 8, further comprising:
   an adhesive part disposed on the one surface of the reinforcing plate exposed through the open hole, wherein the first piezoelectric element and the second piezoelectric element are attached on the reinforcing plate by the adhesive part.

10. The camera actuator of claim 9, wherein the driving part includes a solder part electrically connecting the first piezoelectric element and the second piezoelectric element and the substrate part.

11. The camera actuator of claim 2, wherein the substrate part includes:
   a first region disposed in an accommodation space of the housing; and
   a second region extending from the first region and exposed to an outside of a base.

12. The camera actuator of claim 11, wherein the housing includes a housing hole corresponding to the second region of the substrate part and a protrusion to which the second region of the substrate part is coupled.

13. The camera actuator of claim 12, wherein the second region of the substrate part is coupled to the housing and supports the driving part and the prism part to float in the accommodation space of the housing.

14. A camera module, comprising:
   a first camera actuator; and a second camera actuator, wherein the first camera actuator performs an optical image stabilizer (OIS) function, and wherein the second camera actuator performs an auto focusing or zoom function, wherein the first camera actuator includes:
a housing;
a prism part disposed in the housing; and
a driving part disposed in the housing and tilting the prism part, wherein the driving part includes:
a substrate part;
a reinforcing plate disposed on the substrate part; and
a plurality of piezoelectric elements disposed on the reinforcing plate, wherein the substrate part includes an open hole exposing a region in which the plurality of piezoelectric elements are to be disposed on one surface of the reinforcing plate, and wherein the plurality of piezoelectric elements are electrically connected to the substrate part in a state attached to the reinforcing plate through the open hole.

15. The camera module of claim 14, wherein the plurality of piezoelectric elements includes:
a first piezoelectric element disposed in a region overlapping in a first direction with respect to a center of the prism part; and
a second piezoelectric element disposed in a region overlapping in a second direction different from the first direction with respect to the center of the prism part, the prism part is provided to be tiltable in the second direction by the first piezoelectric element, and is provided to be tiltable in the first direction by the second piezoelectric element.

16. The camera module of claim 15, wherein the prism part includes:
a prism; and
a prism mover disposed surrounding the prism, wherein the prism mover includes a first side part facing the driving part, wherein the first side part includes a first protrusion part corresponding to the first piezoelectric element and a second protrusion part corresponding to the second piezoelectric element, wherein the first piezoelectric element contacts the first protrusion part, and the second piezoelectric element contacts the second protrusion part.

17. The camera module of claim 16, wherein the first actuator further includes:
a holder to which the prism part is coupled, wherein the holder includes a second side part corresponding to the first side part of the prism mover, wherein the second side part includes a first holder hole corresponding to the first piezoelectric element and the first protrusion part, and a second holder hole corresponding to the second piezoelectric element and the second protrusion part, wherein the holder includes a rotation guide part into which a recess of the prism mover is fitted, and wherein the recess of the prism mover and the rotation guide part include an inclined surface.

18. The camera module of claim 17, wherein the open hole exposes a region in which the first piezoelectric element and the second piezoelectric element are to be disposed on the one surface of the reinforcing plate, and wherein an adhesive part disposed on the one surface of the reinforcing plate exposed through the open hole, and wherein the first piezoelectric element and the second piezoelectric element are attached on the reinforcing plate by the adhesive part.

19. The camera module of claim 15, wherein the substrate part includes:
a first region disposed in an accommodation space of the housing; and
a second region extending from the first region and exposed to an outside of a base, wherein the housing includes a housing hole corresponding to the second region of the substrate part and a protrusion to which the second region of the substrate part is coupled.

20. The camera module of claim 19, wherein the second region of the substrate part is coupled to the housing and supports the driving part and the prism part to float in the accommodation space of the housing.

* * * * *